United States Patent
Song et al.

(10) Patent No.: US 12,078,302 B2
(45) Date of Patent: Sep. 3, 2024

(54) LIGHT SOURCE FOR PLANT CULTIVATION AND PLANT CULTIVATION DEVICE

(71) Applicant: SEOUL VIOSYS CO., LTD., Gyeonggi-do (KR)

(72) Inventors: Hyun Su Song, Gyeonggi-do (KR); Sang Min Ko, Gyeonggi-do (KR); Jong Hyeon Koo, Gyeonggi-do (KR); Se Ryung Kim, Gyeonggi-do (KR); Jin Won Kim, Gyeonggi-do (KR)

(73) Assignee: SEOUL VIOSYS CO., LTD., Gyeonggi-do (KR)

( * ) Notice: Subject to any disclaimer, the term of this patent is extended or adjusted under 35 U.S.C. 154(b) by 330 days.

(21) Appl. No.: 17/475,937

(22) Filed: Sep. 15, 2021

(65) Prior Publication Data

US 2022/0003370 A1    Jan. 6, 2022

Related U.S. Application Data

(63) Continuation of application No. 16/536,222, filed on Aug. 8, 2019, now Pat. No. 11,125,405.
(Continued)

(51) Int. Cl.
    *F21S 10/02*      (2006.01)
    *F21V 23/00*      (2015.01)
    (Continued)

(52) U.S. Cl.
    CPC .......... *F21S 10/023* (2013.01); *F21V 23/003* (2013.01); *H05B 45/20* (2020.01); *F21W 2131/109* (2013.01)

(58) Field of Classification Search
    CPC .................. F21S 10/023; F21W 2131/109
    See application file for complete search history.

(56) References Cited

U.S. PATENT DOCUMENTS

| 8,373,363 | B2 | 2/2013 | Grajcar |
| 8,531,136 | B2 | 9/2013 | Grajcar |

(Continued)

FOREIGN PATENT DOCUMENTS

| CA | 3 003 437 A1 | 7/2018 |
| JP | 2003339236 A | 12/2003 |

(Continued)

OTHER PUBLICATIONS

International Search Report for International Application No. PCT/KR2019/010771, mailed Nov. 29, 2019, 5 pages.
(Continued)

*Primary Examiner* — Alexander H Taningco
*Assistant Examiner* — Pedro C Fernandez
(74) *Attorney, Agent, or Firm* — Oblon, McClelland, Maier & Neustadt, L.L.P.

(57) ABSTRACT

A plant cultivation light source includes a substrate and a first group of light sources. The first group of light sources includes a plurality of light sources disposed on the substrate, and a light source including a light emitting structure including a first semiconductor layer, an active layer, and a second semiconductor layer. The plurality of light sources operates to emit lights having different wavelength bands and includes a first light source that emits first light having an area of at least about 55% compared with an area of a normalized solar spectrum, a second light source that emits second light having a wavelength for cryptochrome, and a third light source that emits third light having a wavelength for phytochrome.

19 Claims, 15 Drawing Sheets

Related U.S. Application Data

(60) Provisional application No. 62/824,473, filed on Mar. 27, 2019, provisional application No. 62/717,304, filed on Aug. 10, 2018.

(51) Int. Cl.
*H05B 45/20* (2020.01)
*F21W 131/109* (2006.01)

(56) References Cited

U.S. PATENT DOCUMENTS

| | | | |
|---|---|---|---|
| 8,596,804 B2 | 12/2013 | Grajcar | |
| 8,643,308 B2 | 2/2014 | Grajcar | |
| 8,651,691 B2 | 2/2014 | Grajcar | |
| 2005/0135104 A1 | 6/2005 | Crabb et al. | |
| 2007/0058368 A1 | 3/2007 | Partee et al. | |
| 2008/0302004 A1 | 12/2008 | Lin | |
| 2010/0020536 A1 | 1/2010 | Bafetti et al. | |
| 2011/0016785 A1* | 1/2011 | Yamada | H05B 47/155 47/1.01 R |
| 2011/0101883 A1 | 5/2011 | Grajcar | |
| 2011/0109244 A1 | 5/2011 | Grajcar | |
| 2011/0163246 A1* | 7/2011 | Ishiwata | A01G 7/045 250/492.1 |
| 2011/0179706 A1 | 7/2011 | Hunt et al. | |
| 2011/0209400 A1 | 9/2011 | Rooymans | |
| 2011/0228515 A1 | 9/2011 | Grajcar | |
| 2011/0273098 A1 | 11/2011 | Grajcar | |
| 2012/0075848 A1* | 3/2012 | Yamada | A01G 9/249 362/231 |
| 2012/0268918 A1 | 10/2012 | Grajcar | |
| 2013/0040380 A1 | 2/2013 | Hunt et al. | |
| 2014/0069007 A1* | 3/2014 | Chen | A01G 9/249 47/66.6 |
| 2014/0152194 A1 | 6/2014 | Beyer | |
| 2014/0250778 A1 | 9/2014 | Suntych | |
| 2015/0128488 A1 | 5/2015 | Casper et al. | |
| 2015/0128489 A1* | 5/2015 | Yamada | A01G 7/045 47/58.1 LS |
| 2015/0150195 A1 | 6/2015 | Grajcar | |
| 2015/0216130 A1 | 8/2015 | Grajcar et al. | |
| 2015/0273235 A1 | 10/2015 | Grajcar | |
| 2016/0014974 A1 | 1/2016 | Grajcar et al. | |
| 2016/0088802 A1* | 3/2016 | Nicole | H05B 47/11 315/297 |
| 2016/0111596 A1* | 4/2016 | Kim | H01L 33/06 315/297 |
| 2016/0113213 A1 | 4/2016 | Berinsky | |
| 2016/0205739 A1 | 7/2016 | Grajcar | |
| 2017/0311553 A1 | 11/2017 | Dobrinsky et al. | |
| 2018/0028700 A1* | 2/2018 | Dobrinsky | A61L 2/0047 |
| 2019/0166672 A1* | 5/2019 | Lee | G09G 3/2003 |
| 2020/0060099 A1 | 2/2020 | Kim et al. | |

FOREIGN PATENT DOCUMENTS

| | | |
|---|---|---|
| JP | 2007-089430 | 4/2007 |
| JP | 2012205520 A | 10/2012 |
| JP | 2013123417 A | 6/2013 |
| JP | 5652954 B2 | 1/2015 |
| JP | 2015-521046 | 7/2015 |
| KR | 1020100135919 B1 | 12/2010 |
| WO | 2017188719 A1 | 11/2017 |

OTHER PUBLICATIONS

Non-Final Office Action issued in U.S. Appl. No. 16/536,222, issued Dec. 3, 2020, 12 pages.
Non-Final Office Action issued in U.S. Appl. No. 16/548,337, issued Jan. 31, 2020, 16 pages.
Final Office Action issued in U.S. Appl. No. 16/548,337, issued Apr. 23, 2020, 17 pages.
Notice of Allowance issued in U.S. Appl. No. 16/536,222, issued May 21, 2021, 12 pages.
Notice of Allowance issued in U.S. Appl. No. 16/548,337, issued Jul. 17, 2020, 10 pages.
International Search Report for International Application No. PCT/KR/2019/010772, mailed Nov. 29, 2019, 3 pages.
Non-Final Office Action issued in U.S. Appl. No. 16/548,350, issued Jul. 6, 2021, 12, pages.
Notification of Reasons for Refusal issued in corresponding Japanese Patent Application No. 2021-530762 mailed Jul. 18, 2023 (with English translation) 10 pages.
Extended European Search Report issued in corresponding EP Application No. 19848125.1, issued Apr. 12, 2022, 10 pages.
European Office Action issued Mar. 28, 2024, in European Patent Application No. 19 848 125.1, 12 pages.

* cited by examiner

LIGHT SOURCE FOR PLANT CULTIVATION AND PLANT CULTIVATION DEVICE

CROSS-REFERENCE OF RELATED APPLICATIONS AND PRIORITY

The Present Application is a continuation of U.S. patent application Ser. No. 16/536,222 filed Aug. 8, 2019 which claims priority to and benefit of U.S. Provisional Application Nos. 62/717,304 filed Aug. 10, 2018 and 62/824,473 filed Mar. 27, 2019, the disclosure of which are incorporated by reference in their entirety as if fully set forth herein.

BACKGROUND

1. Field of Disclosure

The present disclosure relates to a plant cultivation device and a plant cultivation method.

2. Description of the Related Art

In recent years, with the growing interest in health, there are increasing demands for foods that are safer and healthier, such as, organic food. Typically, consumers purchase organic food at a grocery store or a market, but consumers gradually have developed the strong desire to self-produce organic food for their consumption. In particular, it may be relatively more accessible for consumers to self-produce vegetables than other food products, and therefore, there is a large demand for a plant cultivation equipment.

In addition, interest in health leads to more attention on anti-aging, and recently, there has been a great interest in environmentally friendly anti-aging methods through ingestion of antioxidant present in food rather than artificial anti-aging methods through medical procedures and prescription medications. It is known that a build-up of reactive oxygen species causes damage to cells and tissues and promotes aging of all tissues of human body including skin, and the antioxidant eliminates reactive oxygen species and delays body aging. Antioxidant-rich materials include vitamins, phenolic compounds, and carotenoids. In particular, phenolic compounds are widely present in plants, are highly antioxidant, and also directly block ultraviolet rays that promote skin aging. Plants known to have high levels of antioxidants include legumes, berries, and vegetables. In order to meet the demand for safer and healthier foods, there is a need to develop a method for increasing the total phenolic compound content in plants that are easy to grow at home.

SUMMARY

The present disclosure provides a plant having a high total phenolic compound content and a high antioxidant capacity.

According to one or more embodiments of the present disclosure, a plant cultivation light source includes a substrate, and a first group of light sources. The first group of light sources includes a plurality of light sources disposed on the substrate. A light source includes a light emitting structure including a first semiconductor layer, an active layer, and a second semiconductor layer. The plurality of light sources operates to emit lights having different wavelength bands and includes a first light source that emits first light having an area of at least about 55% compared with an area of a normalized solar spectrum, a second light source that emits second light having a wavelength for cryptochrome, and a third light source that emits third light having a wavelength for phytochrome.

In at least one variant, the first light source includes a peak having a deviation equal to or smaller than about 0.14 compared with the normalized solar spectrum.

In another variant, the plant cultivation light source further includes a second group of light sources that have a wavelength band between 200 nm and 400 nm.

In further another variant, the plant cultivation light source further includes a controller coupled to the plurality of light sources in the first group of light sources and controlling a lighting condition and a dark condition. The first group of light sources is turned off during the dark condition.

In another variant, a ratio of the lighting condition to the dark condition is 1:1 to 2:1

In another variant, the plurality of light sources in the first group of light sources further comprises an IR light source.

In another variant, the plurality of light sources further comprises a white light emitting diode light source which irradiates at a dose of about 60 µmol/m$^2$s.

In another variant, the second group of light sources is turned on or off such that a dose of the light is equal to or greater than about 1 kJ/m$^2$s and equal to or smaller than about 14 kJ/m$^2$s.

In another variant, the plant cultivation light source further includes a second group of light sources that have a wavelength band of between 200 nm to 400 nm. The controller controls the second group light sources to irradiate light to a selected plant for a predetermined number of hours prior to harvesting of the selected plant.

In another variant, a plant includes a Fabaceae Family plant, or a Poaceae Family plant.

According to one or more embodiments of the present disclosure, a plant cultivation device includes a plant cultivation light source unit, a housing that houses a plant and the plant cultivation light source unit installed therein, and a controller that controls the plant cultivation light source unit. The plant cultivation light source unit includes a substrate, and a first group of light sources. The first group of light sources includes a plurality of light sources disposed on the substrate. A light source includes a light emitting structure including a first semiconductor layer, an active layer, and a second semiconductor layer. The plurality of light sources operates to emit lights having different wavelength bands and includes a first light source that emits first light having an area of at least about 55% compared with an area of a normalized solar spectrum, a second light source that emits second light having a wavelength for cryptochrome, and a third light source that emits third light having a wavelength for phytochrome.

Embodiments of the inventive concept provide a plant cultivation light source including a first light source emitting a first light in a first wavelength band and a second light source emitting a second light in a second wavelength band different from the first wavelength band. The second wavelength band includes an ultraviolet light wavelength band, and the second light source is independently driven from the first light source to determine whether to emit the second light when the first light source emits the first light.

The first light source is turned on to emit the first light in a lighting condition and turned off in a dark condition.

The second light source is turned on to emit the second light in the lighting condition and turned off not to emit the second light in the lighting condition.

The lighting condition and the dark condition are repeated on a 24-hour basis.

A ratio of the lighting condition to the dark condition is 1:1 to 2:1.

The first wavelength band includes a visible light wavelength band.

The second wavelength band includes a wavelength band from about 250 nm to about 380 nm.

The second light has a peak wavelength in a range from about 270 nm to about 300 nm.

The second light source is turned on or off such that a dose of the second light is equal to or greater than about 1 kJ/m$^2$s and equal to or smaller than about 14 kJ/m$^2$s.

The first light source emits the first light having a relatively high intensity in a wavelength band from about 440 nm to about 495 nm and a wavelength band from about 620 nm to about 750 nm.

Embodiments of the inventive concept provide a plant cultivation device including a light source unit emitting a light in a visible light wavelength band and a light in an ultraviolet light wavelength band, a housing provided with a plant disposed therein, the light source unit being installed inside the housing, and a controller controlling the light source unit. The light source unit includes a first light source emitting a first light in a first wavelength band and a second light source emitting a second light in a second wavelength band different from the first wavelength band. The second wavelength band includes the ultraviolet light wavelength band, the controller controls the first light source to be turned on in a lighting condition and to be turned off in a dark condition, and the controller controls the second light source to be independently turned on or turned off from the first light source in the lighting condition.

The first wavelength band includes the visible light wavelength band.

The controller allows the dark condition different from the lighting condition and the lighting condition to be repeated on a 24-hour basis.

The second light has a peak wavelength in a range from about 270 nm to about 300 nm.

The controller controls a dose of the second light to become about 1 kJ/m$^2$s or more and about 14 kJ/m$^2$s or less.

The housing provides a space in which the plant is placed and cultivated, and the first light source and the second light source are provided on an inner surface of the housing.

The housing includes a lower case and an upper case, which are capable of being opened and closed by being engaged to each other, and the first and second light sources are provided on an inner surface of the upper case.

A ratio of the lighting condition to the dark condition is 1:1 to 2:1.

The controller controls the second light source to allow the second light source to irradiate the light to the plant for three hours before the plant is harvested.

The plant is a Fabaceae Family plant or a Poaceae Family plant.

According to the above, the plants having a high total phenolic compound content and a high antioxidant capacity may be provided.

According to the above, the optimized growth environment depending on the type of plants may be provided.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF EMBODIMENTS

Figure 1:
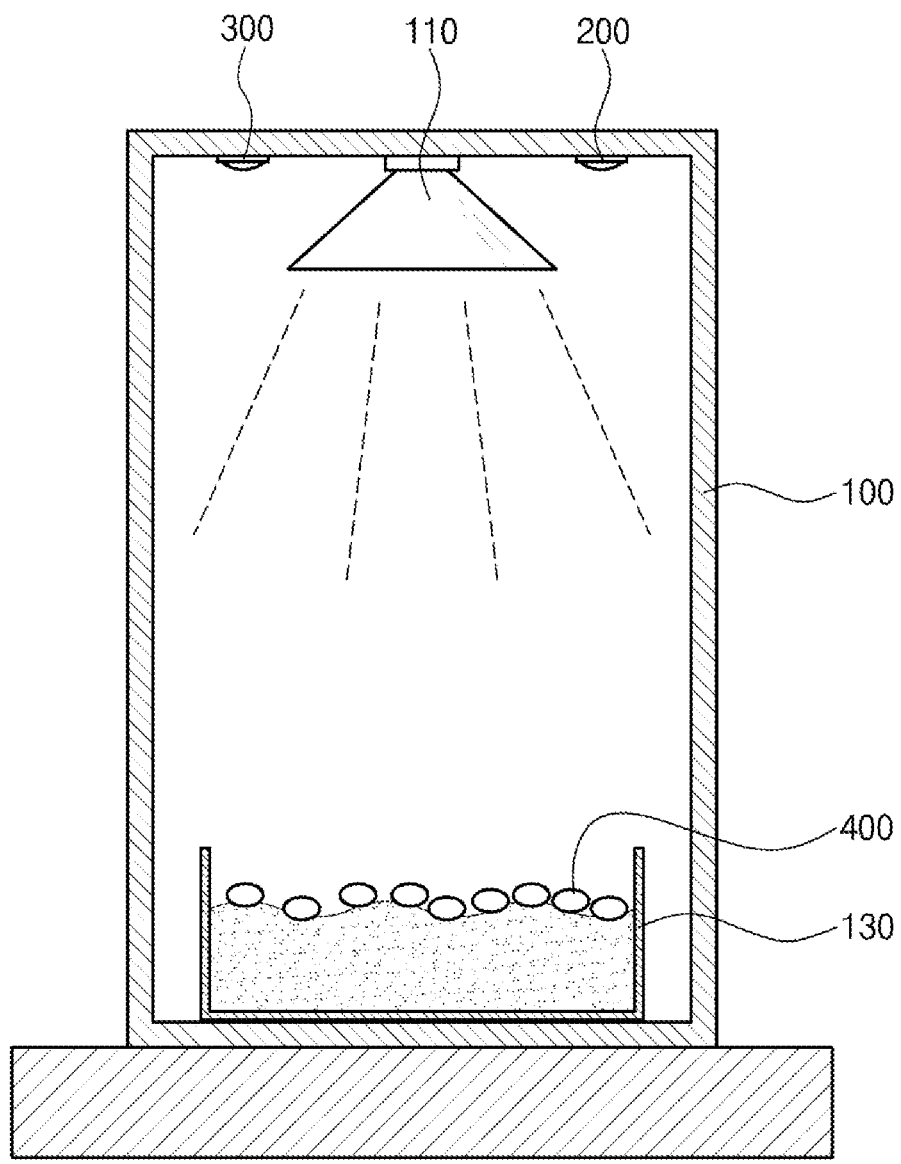
FIG. 1 is a cross-sectional view showing a plant cultivation device according to an exemplary embodiment of the present disclosure.

The present disclosure may be variously modified and realized in many different forms, and thus specific embodiments will be exemplified in the drawings and described in detail herein below. However, the present disclosure should not be limited to the specific disclosed forms, and be construed to include all modifications, equivalents, or replacements included in the spirit and scope of the present disclosure.

Like numerals refer to like elements throughout. In the drawings, the thickness, ratio, and dimension of components are exaggerated for effective description of the technical content. It will be understood that, although the terms first, second, etc. may be used herein to describe various elements, components, regions, layers and/or sections, these elements, components, regions, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

It will be further understood that the terms "comprises" and/or "comprising", or "includes" and/or "including", when used in this specification, specify the presence of stated features, integers, steps, operations, elements, and/or components, but do not preclude the presence or addition of one or more other features, integers, steps, operations, elements, components, and/or groups thereof. In addition, it will be understood that when a layer, film, region, or plate is referred to as being "on" another layer, film, region, or plate, it can be directly on the other layer, film, region, or plate or intervening layers, films, regions, or plates may be present. Further, it will be understood that when a layer, film, region, or plate is referred to as being formed on another layer, film, region, or plate, the forming direction is not limited to an upward direction but includes a lateral or downward direction. Further, it will be understood that when a layer, film, region, or plate is referred to as being "under" another layer, film, region, or plate, it can be directly under the other layer, film, region, or plate or intervening layer, film, region, or plate may be present.

Hereinafter, exemplary embodiments of the present disclosure will be explained in detail with reference to the accompanying drawings.

By using a plant cultivation method according to an exemplary embodiment of the present disclosure, a plant having a high total phenolic compound content may be cultivated. More specifically, the plant having a high total phenolic compound content may be obtained by germinating a seed during a first time, irradiating a light in a first wavelength band to the germinated seed during a second time to grow the plant from the seed, and irradiating a light in a second wavelength band to the grown plant during a third time immediately before harvesting the plant.

Hereinafter, a plant cultivation device that may be used for cultivating the plant according to the plant cultivation method according to an exemplary embodiment of the present disclosure will be described.

FIG. 1 is a cross-sectional view showing a plant cultivation device according to an exemplary embodiment of the present disclosure.

Referring to FIG. 1, the plant cultivation device 10 according to the exemplary embodiment of the present disclosure includes a main body 100, a first light source 200, and a second light source 300, and seeds 400 are provided in the main body 100.

The main body 100 may include an empty space in which the seeds 400 are provided and may be provided in a box shape that can block an external light.

The main body 100 provides an environment in which the seeds 400 may be grown. The main body 100 may have a size such that a plurality of seeds 400 may be provided and grown. The size of the main body 100 may change depending on the use of the plant cultivation device 10. For example, the size of the main body 100 may be relatively small where the plant cultivation device 10 is used for a small-scale plant cultivation at home. Where the plant cultivation device 10 is used for commercial plant cultivation, the size of the main body 100 may be relatively large.

The main body 100 may block the light such that external light is not incident into the main body 100. A dark room environment, which is isolated from the outside, may be provided inside the main body 100. Therefore, external light may be prevented from being irradiated to the seeds 400 inside the main body 100. In particular, the main body 100 may prevent external visible light from being irradiated to the seeds 400. However, depending on circumstances, the main body 100 may be designed to be partially open such that the main body 100 may receive the external light as it is.

A photocatalyst may be coated on an interior surface of the main body 100. The photocatalyst receives the light provided from the first light source 200 and activates a photocatalytic reaction. Although the interior space of the main body 100 is maintained in the dark room environment with a lot of moisture, it is possible to prevent bacteria or fungi from growing inside the main body 100. A photocatalytic material for performing this function may include at least one selected from titanium dioxide ($TiO_2$), zirconia ($ZrO_2$), tungsten oxide ($WO_3$), zinc oxide (ZnO), and tin oxide ($SnO_2$).

The main body 100 may include a water supply unit 110 and a culture platform 120.

The water supply unit 110 supply water to the seeds 400 provided inside the main body 100. The water supply unit 110 may be configured to be disposed at an upper end of the main body 100 and to spray water onto the culture platform 120 disposed at a lower end of the main body 100. However, the configuration of the water supply unit 110 should not be limited thereto or thereby, and various types of water supply units 110 may be provided depending on a shape of the main body 100 and an arrangement of the culture platform 120. For example, the water supply unit 110 may be provided in the form of a rotating sprinkler, a mist nozzle spray, a mist generator, or the like.

One or more water supply units 110 may be provided. The number of the water supply units 110 may be changed depending on the size of the main body 100. For instance, for a relatively small-sized plant cultivation device 10 for in-home use, one water supply unit 110 may be used since the size of the main body 100 is small. For a relatively large-sized commercial plant cultivation device 10, plural water supply units 110 may be used since the size of the main body 100 is large.

The water supply unit 110 may be connected to a water tank provided in the main body 100, or a faucet outside the main body 100. In addition, the water supply unit 110 may further include a filtration unit such that contaminants floating in the water are not provided to the seeds 400. The filtration unit may include a filter, such as an activated carbon filter or a non-woven fabric filter, and thus water passing through the filtration unit may be purified. The filtration unit may further include a light irradiation filter. The light irradiation filter may remove germs, bacteria, fungal spores, and the like, which are present in water, by irradiating an ultraviolet light or the like to the water. As the water supply unit 110 includes the above-mentioned filtration unit, the inside of the main body 100 and the seeds 400 may not be contaminated even when water from the water discharge unit is recycled or rainwater or the like is directly used for the cultivation.

The water supply unit 110 may include a timer. Therefore, the water supply unit 110 may supply water to the seeds 400 at predetermined time intervals without a user's operation. The intervals at which water is supplied to the seeds 400 may vary depending on the type of the seeds 400. For plants that require a large amount of water for growth, water may be supplied at relatively short intervals, and for plants that require less water for growth, water may be supplied at relatively long intervals.

Water provided from the water supply unit 110 may contain nutrients necessary for the growth of the plant. For example, the water may contain inorganic elements necessary for the growth of plant, such as nitrogen (N), phosphorus (P), potassium (K), calcium (Ca), magnesium (Mg), sulfur (S), iron (Fe), manganese (Mn), copper (Cu), zinc (An), Boron (B), and molybdenum (Mo). For instance, Sachs's solution, Knop's solution, Hoagland solution, or Hewitt's solution may be supplied from the water supply unit 110.

The seeds 400 are provided on the culture platform 120. The culture platform 120 may support the seeds 400, and substantially simultaneously, may provide the nutrients to the seeds 400 to be grown. Thus, the culture platform 120 may include a culture medium required to grow the seeds 400, and the culture medium may include inorganic elements, such as nitrogen (N), phosphorus (P), potassium (K), calcium (Ca), magnesium (Mg), sulfur (S), iron (Fe), manganese (Mn), copper (Cu), zinc (Zn), Boron (B), and molybdenum (Mo).

The culture platform 120 may be provided in a shape including the culture medium and a container accommodating the culture medium. The container may have a box shape in which at least one surface, e.g., an upper surface, is removed. The culture medium and the seeds 400 may be provided inside the container having the box shape. The seeds 400 may be provided while being imbedded in the culture medium or placed on a surface of the culture medium depending on its type.

The culture platform 120 may have a size and a shape, which vary depending on the shape of the main body 100 and the providing manner of the first light source 200 and the second light source 300. The size and the shape of the culture platform 120 may be configured to allow the seeds 400 provided on the culture platform 120 to be placed within an irradiation range of the light irradiated from the first light source 200 and the second light source 300. Accordingly, even though the plural seeds 400 are provided on the culture platform 120, the plants may grow uniformly from the seeds 400 irrespective of the position of the seeds 400.

The first light source 200 irradiates the light in the first wavelength band to the seeds 400. The seeds 400 may grow by being irradiated with the light in the first wavelength band.

The first wavelength band emitted from the first light source 200 may be a visible light wavelength band. Therefore, the seeds 400 may receive the light in the first wavelength band, which is emitted from the first light source 200, and may perform photosynthesis. The plants may grow from the seeds 400 due to the photosynthesis.

As described above, the first light source 200 may include one or more light emitting diodes to emit the light in the visible light wavelength band. When the first light source 200 includes one light emitting diode, the above-mentioned light emitting diode may be a light emitting diode that emits a white light. When the first light source 200 includes plural light emitting diodes, the light emitting diodes may emit lights having different wavelength bands.

When the first light source 200 includes the plural light emitting diodes, the light emitting diodes may include, for example, a light emitting diode that emits a red light and a light emitting diode that emits a blue light. The plants may receive the visible lights emitted from the above-mentioned light emitting diodes and may actively perform the photosynthesis. In this case, the red light may promote the photosynthesis of the plants to accelerate the growth of the plants from seeds 400, and the blue light may enhance morphogenesis and an environmental stress resistance of plant leaves germinated from the seeds 400. The first light source 200 may include a light emitting diode that emits a green light. The light emitting diode emitting the green light may increase a photosynthetic efficiency of the plants in communities due to its high light transmittance.

As described above, when the first light source 200 includes the light emitting diodes that emit the lights having different wavelengths, a composition ratio of the light emitting diodes may differ depending on the wavelength. For example, the light emitting diodes that emit the red light and the blue light may be provided less than the light emitting diode that emits the green light. A ratio between the light emitting diodes that emit the red light, the blue light, and the green light may be determined according to the type of the seeds 400. For instance, the composition ratio may vary depending on a ratio of cryptochrome that is a blue light receptor to phytochrome that is a red light receptor. Alternatively, the light-emitting diodes emitting the lights of respective wavelength bands may be provided in the same number, and the light-emitting diodes may be driven at different ratios depending on the type of plants.

Since the light emitting diodes provided in the first light source 200 have a waveform having a high peak at a specific wavelength, it is possible to irradiate the lights customized to the type of the seeds 400. Therefore, plants may grow faster and bigger with less power.

The first light source 200 is provided on the upper surface of the main body 100 and irradiates the light to the seeds 400 provided on the lower surface of the main body 100. A position of the first light source 200 on the upper surface of the main body 100 may be determined by taking into account an irradiation angle of the light from the first light source 200 and a position of the culture platform 120 in which the seeds 400 are provided.

The first light source 200 may emit a light in an infrared or near-infrared wavelength band depending on circumstances.

The first light source 200 may have a waterproof structure. Accordingly, even though water splatters on the first light source 200, there is no possibility that the first light source 200 is malfunctioning.

The second light source 300 emits the light in the second wavelength band to the seeds 400. The second wavelength band is different from the first wavelength band and is in a range from about 200 nm to about 400 nm. As the light in the above-mentioned wavelength is irradiated to the seeds 400, the total phenolic compound content of the seeds 400 and the plants provided from the seeds 400 may increase.

The light emitted from the second light source 300 may include a light having a wavelength of about 275 nm and a light having a wavelength of about 295 nm. When the above-described light is irradiated to the seeds 400, the total phenolic compound content and an antioxidant capacity of the seeds 400 and the plants may increase.

The second light source 300 may include the light emitting diode to irradiate the light. Each of the second light source 300 or the light emitting diode included in the second light source 300 may be provided in a plural number. In this case, the light emitting diodes may emit lights having different wavelengths. For example, the second light source 300 may be configured to allow a portion of the second light sources 300 or the light emitting diodes to emit the light having the wavelength of about 275 nm and the other portion of the second light sources 300 or the light emitting diodes to emit the light having the wavelength of about 295 nm.

The second light source 300 may have a waterproof structure. Accordingly, even though the water splashes on the second light source 300, the second light source 300 may not malfunction.

The seeds 400 may be provided inside the main body 100 and may grow by receiving the water, the light in the first wavelength band, and the light in the second wavelength band. The seeds 400 may be seeds of a Fabaceae family plant or a Poaceae family plant. For example, the seeds 400 may be seeds of soybeans, mung beans, peas, alfalfa, wheat, barley, rice, bamboo, oat, millet, sorghum, sugarcane, and corn. In the case of the seeds of the Fabaceae family plant or the Poaceae family plant, when the seeds of the Fabaceae family plant or the Poaceae family plant are cultivated by the plant cultivation method according to an exemplary embodiment of the present disclosure, it was checked that the total phenolic compound content or the antioxidant capacity was very high. This will be described in detail later.

The seeds 400 receive the light irradiated from the second light source 300 during the cultivation. The light irradiated from the second light source 300 increases the total phenolic compound content of plants grown from the seeds 400. In detail, the light irradiated from the second light source 300 and having the second wavelength band activates secondary metabolite biosynthesis of plants to increase the total phenolic compound content and the antioxidant capacity. When the light in the second wavelength band is irradiated to plants, the light having the above-described wavelength causes mechanisms, such as a DNA-damaging effect on plant cells and a generation of reactive oxygen species, resulting in serious cell and tissue damage. The plants promote the production of the secondary metabolites that are capable of absorbing the light or eliminating the reactive oxygen species to protect the tissue cells.

For example, when the light is provided to the plants grown from the seeds 400, an enzyme such as phenylalanine ammonia-lyase, which is involved in the biosynthesis of the secondary metabolites having the above-mentioned activity, is activated. Thus, the biosynthesis of the phenolic compounds is promoted, and as a result, the antioxidant capacity of the plants increases, and the tissue damage caused by the light is alleviated.

The antioxidant contained in the plants provided by the above-described method may be phenolic compounds, vitamins, and carotenoids.

In addition, the phenolic compounds may include, but are not limited to, flavonoids, phenolic acids, polyphenols, stilbenoids, hydrocinnamic acids, coumaric acids, and the like.

According to the exemplary embodiment of the present disclosure, as the plant cultivation device 10 that includes the main body 100, the first light source 200, and the second light source 300 is provided, plants with a high total phenolic compound content and a high antioxidant capacity may be cultivated without the influence of external environment. In addition, the first wavelength band and the second wavelength band, which are respectively emitted from the first light source 200 and the second light source 300, are configured by taking into account the type of the seeds 400, and thus an optimized growth environment for each plant may be provided.

Figure 2:
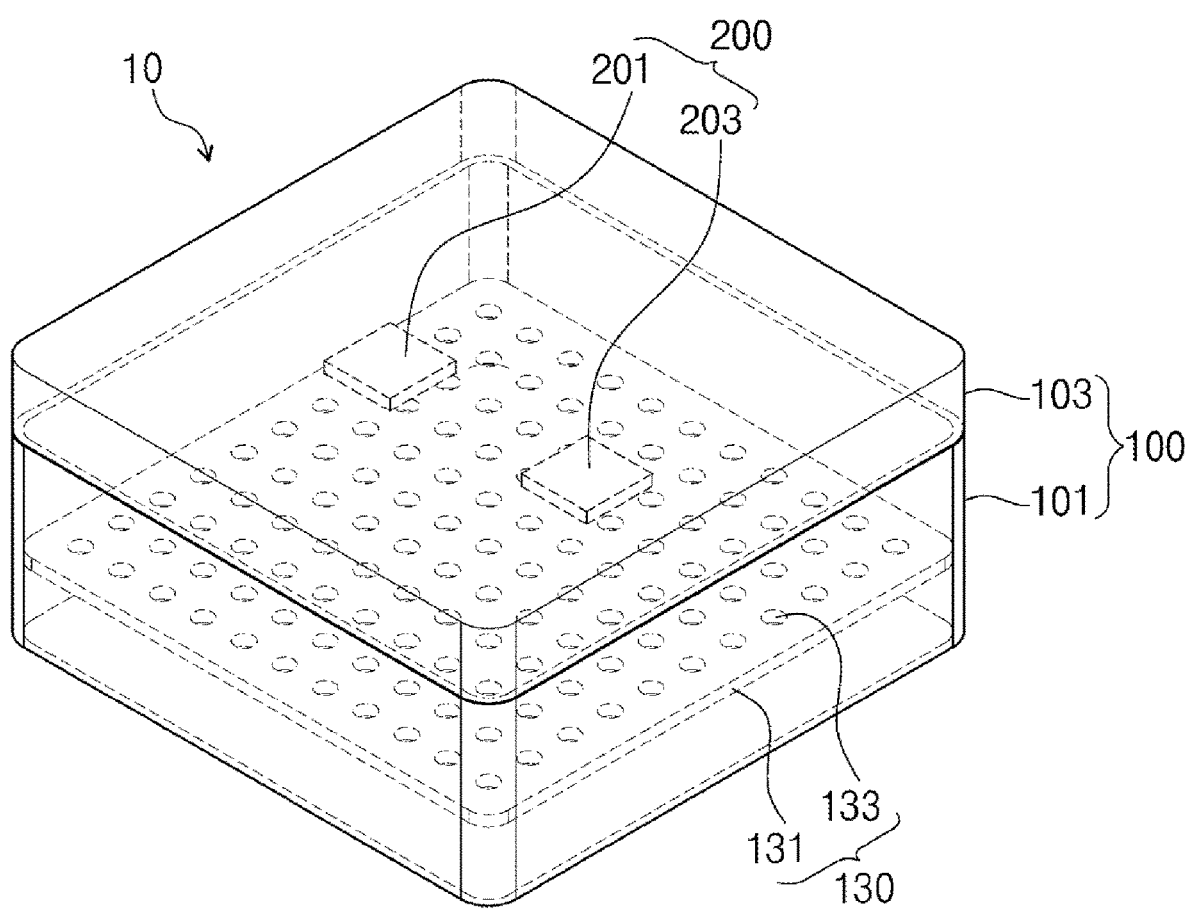
FIG. 2 is a conceptual perspective view showing a cultivation device according to an exemplary embodiment of the present disclosure.

FIG. 2 is a conceptual perspective view showing a plant cultivation device according to an exemplary embodiment of the present disclosure.

Referring to FIG. 2, the plant cultivation device 10 according to the exemplary embodiment of the present disclosure includes a main body 100 having an inner space capable of growing plant sprouts and a first light source unit 200 provided in the main body 100 to emit a light.

The main body 100 provides an empty space therein within which plant seeds may be provided and may be grown into the plant sprouts. The main body 100 may be provided in a box shape that can block an external light. In the exemplary embodiment of the present disclosure, the main body 100 may include a lower case 101 opened upward and an upper case 103 opened downward. The lower case 101 and the upper case 103 may be coupled to each other to form the box shape that blocks the external light.

The lower case 101 includes a bottom portion and a sidewall portion extending upward from the bottom portion. The upper case 103 includes a cover portion and a sidewall portion extending downward from the cover portion. The sidewall portions of the lower case 101 and the upper case 103 may have structures that are engaged with each other. The lower case 101 and the upper case 103 may be coupled to each other, or separated from each other depending on a user's need, and thus a user may open or close the main body 100.

The main body 100 may be provided in various shapes. For example, the main body 100 may have a substantially rectangular parallelepiped shape or may have a cylindrical shape. However, the shape of the main body 100 should not be limited thereto or thereby, and the main body 100 may be provided in other shapes.

In the present exemplary embodiment, the space inside the main body 100 may be provided as one space. However, this is for the convenience of explanation, and the space inside the main body 100 may be divided into a plurality of compartments. That is, partition walls may be provided in the main body 100 to divide the space inside the main body 100 into the compartments.

The first light source unit 200 provides the light to the plant sprouts in the space of the main body 100. The first light source unit 200 is disposed on an inner surface of the upper case 103 or the lower case 101. In the exemplary embodiment of the present disclosure, the first light source unit 200 may be disposed on the cover portion of the upper case 103. In the present exemplary embodiment, the first light source unit 200 disposed on an inner surface of the cover portion of the upper case 103 is shown; however, it is not limited thereto or thereby. For example, according to another embodiment of the present disclosure, the first light source unit 200 may be disposed on the sidewall portion of the upper case 103. As another example, according to another embodiment of the present disclosure, the first light source unit 200 may be disposed on the sidewall portion of the lower case 101, e.g., on an upper end of the sidewall portion. As another example, according to another embodiment of the present disclosure, the first light source unit 200 may be disposed on at least one of the cover portion of the upper case 103, the sidewall portion of the upper case 103, and the sidewall portion of the lower case 101.

A culture platform 130 may be provided in the space of the main body 100 to cultivate the plant easily, for example, for facilitating a hydroponic culture. The culture platform 130 may include a plate-shaped plate 131 disposed at a position spaced apart upward from the bottom portion of the main body 100. A through-hole 133 with a uniform size may be provided through the plate 131. The culture platform 130 may be provided to allow the seeds of the Poaceae family plant to be grown on an upper surface of the plate 131 and may include a plurality of through-holes 133 to allow water supplied thereto to be drained when the water is supplied in a state where the seeds of the Poaceae family plant are placed on the upper surface thereof. The through-hole 133 may be provided in a size such that the seeds of the Poaceae family plant do not slip through. For example, the through-hole 133 may have a diameter smaller than the seed of the Poaceae family plant. A space between the culture platform 130 and the bottom portion of the lower case 101 may serve as a water tank in which the drained water is stored. Accordingly, the water drained downward through the through-hole 133 of the culture platform 130 may be stored between the bottom portion of the lower case 101 and the culture platform 130.

According to the exemplary embodiment of the present disclosure, the sprouts of the Poaceae family plant may also be cultivated by methods other than hydroponic culture. In this case, water, a culture medium, and soil may be provided in the space of the main body 100 to supply water and/or nutrients necessary for the sprouts of the Poaceae family plant, and the main body 100 may serve as a container. The culture medium or soil may contain the nutrients for the seeds to grow, such as potassium (K), calcium (Ca), magnesium (Mg), sodium (Na), and iron (Fe). The seeds may be provided while being imbedded in the culture medium or placed on a surface of the culture medium depending on its type.

The culture platform 130 may have a size and a shape, which vary depending on the shape of the main body 100 and how a first light source 201 and a second light source 202 are arranged. The size and the shape of the culture platform 130 may be configured to allow the seeds provided on the culture platform 130 to be placed within an irradiation range of the light irradiated from the first light source 201 and the second light source 203.

The main body 100 may include a water supply unit disposed therein to supply water to the seeds. The water supply unit may be configured to be disposed at an upper end of the main body 100, e.g., on the inner surface of the cover portion of the upper case 103, and to spray water onto the culture platform 130. However, the configuration of the water supply unit should not be limited thereto or thereby, and the configuration of the water supply unit may vary depending on the shape of the main body 100 and the arrangement of the culture platform 130. In addition, users may directly supply water into the main body 100 without a separate water supply unit. In the above descriptions, the simple plant cultivation device according to the exemplary embodiment of the present disclosure has been described. However, since the plant cultivation device according to the embodiment of the present disclosure may be used for commercial plant production, other forms of plant cultivation device for use in commercial plant production will be described in detail.

Figure 3:
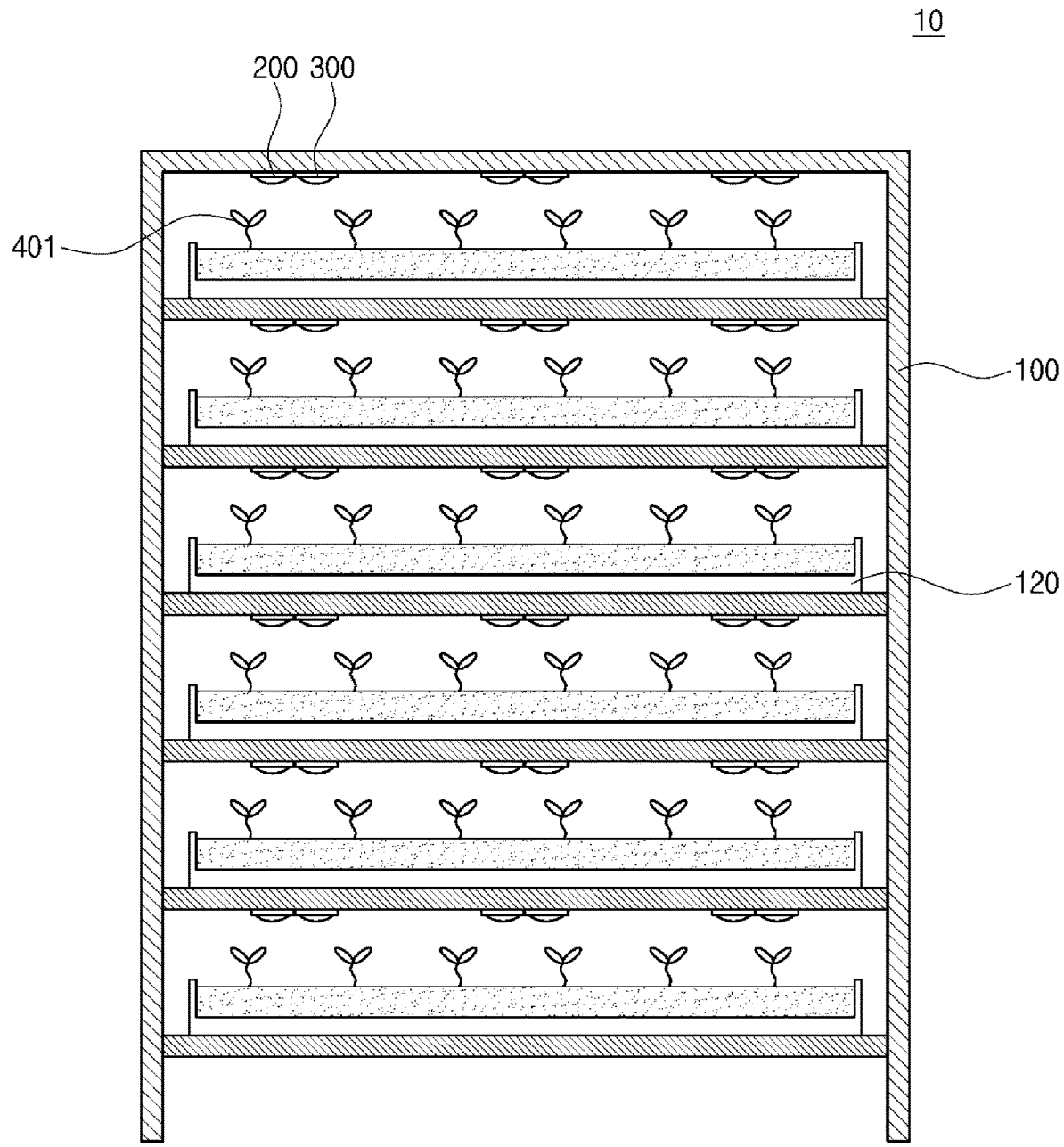
FIG. 3 is a cross-sectional view showing a plant cultivation device according to an exemplary embodiment of the present disclosure.

FIG. 3 is a cross-sectional view showing a plant cultivation device according to an exemplary embodiment of the present disclosure.

The plant cultivation device 10 according to the exemplary embodiment may be operated as a plant production factory. Accordingly, the plant cultivation device 10 may include a plurality of culture platforms 120, a first light source unit 200, and a second light source unit 300.

As shown in figures, the culture platforms 120, the first light source unit 200, and the second light source unit 300 may define several compartments. Therefore, a main body 100 may be provided in a structure that includes several compartments.

The several compartments included in the main body 100 may be operated independently of each other. For example, the first light source unit 200 provided in some compartments may emit more blue light than red light, and the first light source unit 200 provided in other compartments may emit more red light than blue light. In addition, each compartment of the main body 100 may be operated differently in terms of time. For example, the first light source unit 200 may emit the light in the first wavelength band to grow plants 401 in some compartments, and the second light source unit 300 may emit the light in the second wavelength band to increase a total phenolic compound content in the plants 401 in other compartments.

Each compartment included in the main body 100 may be configured to form a closed dark room, and thus each compartment may be independently operated as described above. Therefore, the light(s) emitted from the first light source unit 200 and/or the second light source unit 300 and provided to an arbitrary compartment may not exert an influence on other compartments.

The culture platform 120 provided in the main body 100 may include different culture media from each other depending on the type of the plants 401. Thus, it is possible to provide the growth environment customized to the type of the plants 401. In addition, the culture platform 120 may be separated from the main body 100. Accordingly, when the plants 401 growing on some culture platforms 120 reach a harvesting stage, users may separate only the culture platform 120 on which the plants 401 completely grown are provided from the main body 100 without affecting the entire plant cultivation device 10.

The main body 100 may further include a water supply unit, and the water supply unit is provided on a surface at which the main body 100 makes contact with the culture platform 120 to directly supply the water to the culture medium included in the culture platform 120. Therefore, different from the spray-type water supply unit, water may be supplied without affecting other culture platforms 120 even when the culture platforms 120 are stacked one on another.

The first light source unit 200 may be provided in a plural number according to a shape of the culture platform 120. As described above, the first light source unit 200 may include a plurality of light emitting diodes that emits lights having different wavelengths, and the light emitting diodes may be provided in the same ratio or different ratios in the first light source unit 200. When the light emitting diodes that emit the lights having the different wavelengths are provided in the same ratio in the first light source unit 200, the first wavelength band may be controlled by a controller to correspond to the type of the plants 401. Therefore, the growth environment suitable for the type of the plants 401 may be provided.

Two or more of the second light source unit 300 may be provided. The second light sources 300 may be provided in different compartments from each other in the main body 100 and may be independently operated. Accordingly, the light in the second wavelength band may be irradiated to only the completely grown plants 401 in a phase where the total phenolic compound content is to be increased.

As described above, the plural plants 401 may be substantially simultaneously cultivated using the plant cultivation device 10, and the growth environment suitable for the type of the plants 401 may be independently provided. Accordingly, the plants 401 different from each other may be substantially simultaneously cultivated by using the plant cultivation device 10, and the cultivated plants 401 have a high total phenolic compound content.

Figure 4A:
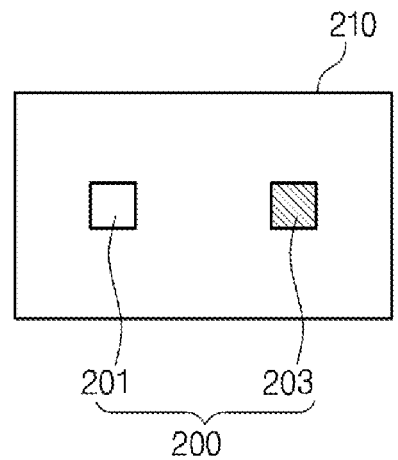
FIG. 4A is a plan view showing a light source unit of a cultivation device according to an exemplary embodiment of the present disclosure.
Figure 4B:
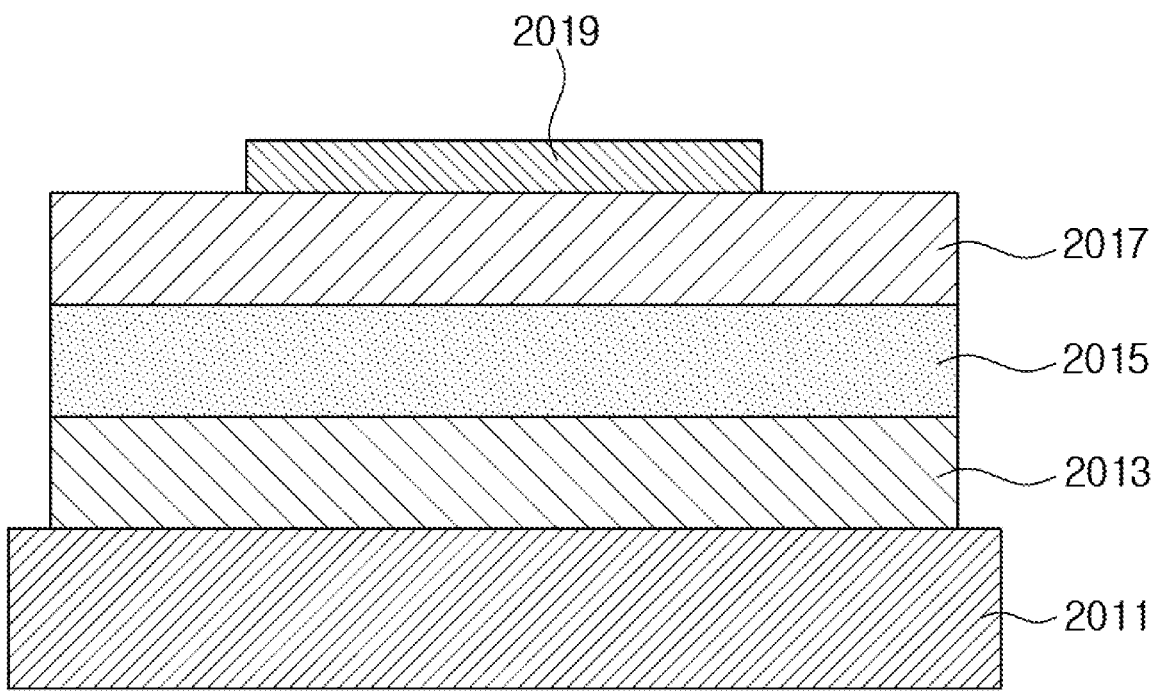
FIG. 4B is a view schematically showing a light emitting diode according to an exemplary embodiment of the present disclosure.
Figure 5:
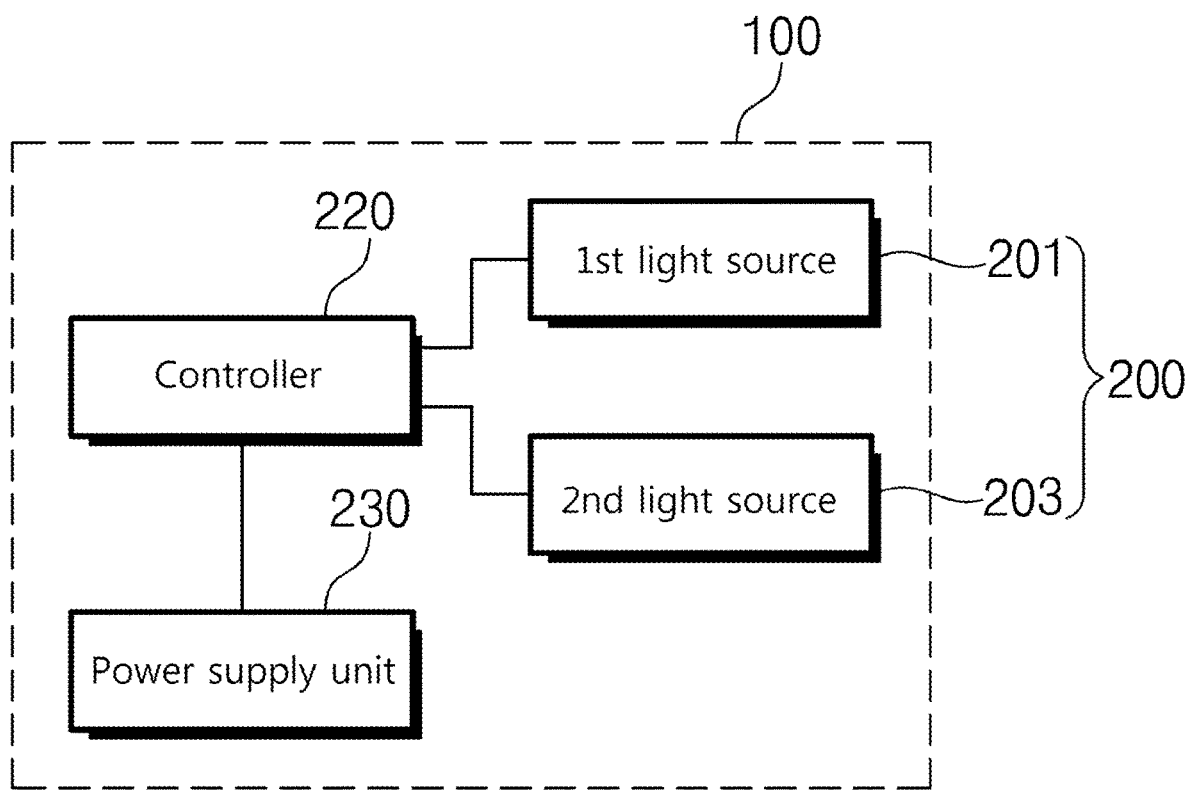
FIG. 5 is a block diagram showing a light source unit of a cultivation device according to an exemplary embodiment of the present disclosure.

Referring to FIGS. 4A, 4B, and 5, the first light source unit 200 includes the first light source 201 that emits the light having a visible light wavelength band and the second light source 203 that provides the light having an ultraviolet wavelength band to the plant sprouts.

The first light source 201 and the second light source 203 may be disposed on a substrate 20. The substrate 20 may be a printed circuit board on which wirings and circuits are formed to allow the first light source 201 and the second light source 203 to be directly mounted thereon, however, the substrate 20 should not be limited to the printed circuit board. The shape and structure of the substrate 20 should not be particularly limited as long as the first light source 201 and the second light source 203 are mounted on the substrate, and the substrate 20 may be omitted. For example, the upper case of the housing described later may be used as the substrate, and the first light source 201 and the second light source 203 may be disposed on the upper case.

The first light source 201 irradiates a light in a first wavelength band to the seeds. The first wavelength band may be a visible light wavelength band, and the seeds may grow by receiving the light in the first wavelength band. The seeds may receive the light in the first wavelength band, which is emitted from the first light source 201, and may perform photosynthesis.

FIG. 4B is a view schematically showing a light emitting diode according to an exemplary embodiment of the present disclosure.

Referring to FIG. 4B, the light emitting diode may include a light emitting structure including a first semiconductor layer 2013, an active layer 2015, and a second semiconductor layer 2017, a first electrode 2011 connected to the light emitting structure, and a second electrode 2019 connected to the light emitting structure.

The first semiconductor layer 2013 is a semiconductor layer doped with a first conductive type dopant. The first conductive type dopant may be a p-type dopant. The first conductive type dopant may be Mg, Zn, Ca, Sr, or Ba. In the exemplary embodiment of the present disclosure, the first semiconductor layer 2013 may include a nitride-based semiconductor material. In the exemplary embodiment of the present disclosure, the material for the first semiconductor layer 2013 may be GaN, AlN, AlGaN, InGaN, InN, InAlGaN, or AlInN.

The active layer 2015 is disposed on the first semiconductor layer 2013 and corresponds to a light emitting layer. The active layer 2015 is a layer in which electrons (or holes) injected through the first semiconductor layer 2013 and holes (or electrons) injected through the second semiconductor layer 2017 meet each other and emit a light due to a band gap difference of an energy band according to a material for forming the active layer 2015.

The active layer 2015 may be implemented with a compound semiconductor. The active layer 2015 may be implemented with, for example, at least one of compound semiconductors of Groups III-V or II-VI.

The second semiconductor layer 2017 is disposed on the active layer 2015. The second semiconductor layer 2017 is a semiconductor layer doped with a second conductive type dopant having a polarity opposite to that of the first conductive type dopant. The second conductive type dopant may be an n-type dopant, and the second conductive type dopant may be, for example, Si, Ge, Se, Te, O, or C.

In the exemplary embodiment of the present disclosure, the second semiconductor layer 2017 may include a nitride-based semiconductor material. The material for the second semiconductor layer 2017 may be GaN, AlN, AlGaN, InGaN, InN, InAlGaN, or AlInN.

The first electrode 2011 and the second electrode 2019 may be provided in various forms to be respectively connected to the first semiconductor layer 2013 and the second semiconductor layer 2017. In the present exemplary embodiment, the first electrode 2011 is disposed under the first semiconductor layer 2013, and the second electrode 2019 is disposed on the second semiconductor 2017, however, they should not be limited thereto or thereby. In the exemplary embodiment of the present disclosure, the first electrode 2011 and the second electrode 2019 may include various metals, such as Al, Ti, Cr, Ni, Au, Ag, Sn, W, Cu, or alloys thereof. Each of the first electrode 2011 and the second electrode 2019 may have a single-layer or multi-layer structure.

In the exemplary embodiment of the present disclosure, the light emitting diode is described as a vertical type light emitting diode, however, the light emitting diode does not necessarily need to be the vertical type and may be provided in other types as long as it corresponds to the concept of the present invention.

According to the exemplary embodiment of the present disclosure, the following effects may be obtained by using the light emitting diode instead of a conventional lamp as a light source for applying the light to a sample.

When the light emitting diode according to the exemplary embodiment of the present disclosure is used as the first light source 201 and/or the second light source 203, a light having a specific wavelength may be provided to the plants compared with a light emitted from the conventional lamp (e.g., a conventional UV lamp). The light emitted from the conventional lamp has a broad spectrum in a wide area compared with the light emitted from the light emitting diode. Accordingly, in the case of the conventional UV lamp, it is not easy to separate only the light of some bands from the wavelength band of the emitted light. In contrast, the light emitted from the light emitting diode has a sharp peak at a specific wavelength and provides a light of a specific wavelength having a very narrow full-width-half-maximum in comparison with the light from the conventional lamp. Therefore, it is easy to select the light of the specific wavelength, and only the light of the selected specific wavelength may be provided to the sample.

In addition, in the case of the conventional lamp, it is difficult to precisely limit an amount of the light while providing the light to a sample, but in the case of the light emitting diode, it is possible to precisely limit the amount of the light while providing the light. Further, in the case of the conventional lamp, it is difficult to precisely limit the amount of the light, and thus, an irradiation time may be set in a wide range. However, in the case of the light emitting diode, the light may be provided to the sample within a definite time for a relatively short time.

As described above, in the case of the conventional lamp, it is difficult to clearly determine the amount of the light due to the relatively wide wavelength, the wide range of light amount, and the wide range of irradiation time. In contrast, in the case of the light emitting diode, a clear light dose may be provided due to the relatively narrow range of wavelength, the narrow range of light amount, and the narrow range of irradiation time.

In addition, in the case of the conventional lamp, it takes a long time to reach a maximum amount of light after turning on the power. In contrast, when using light emitting diodes, it reaches the maximum amount of light with substantially no warm-up time after turning on the power. Thus, in the case of the light emitting diode light source, the irradiation time of the light may be accurately controlled when the plants are irradiated with a light of a specific wavelength.

In the exemplary embodiment of the present disclosure, the first light source may emit a light having a wavelength band similar to that of sunlight so that the seeds grow as much as possible.

Figure 6:
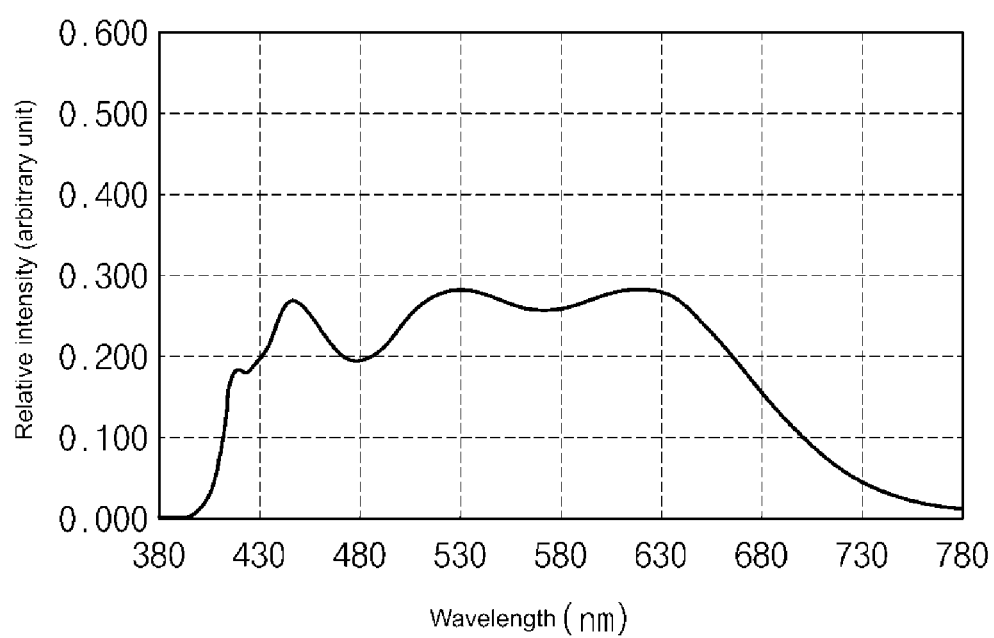
FIG. 6 is a graph showing a spectrum of a light emitted from a first light source of a plant cultivation device when the first light source has a wavelength band similar to a sunlight according to an exemplary embodiment of the present disclosure.

FIG. 6 is a graph showing a spectrum of the light emitted from the first light source of the cultivation device when the first light source has the wavelength band similar to that of the sunlight according to an exemplary embodiment of the present disclosure. Referring to FIG. 6, the first light source may emit the light in the wavelength band from about 380 nm to about 750 nm. Most of the light may be in the visible light wavelength band. That is, the first light source corresponds to a light source that emits a white light.

The first light source may include one or more light emitting diodes to emit the light in the visible light wavelength band. In the drawings, one first light source is shown; however, the number of the first light sources should not be limited to one. The plural light emitting diodes may be provided. When the first light source includes the plural light emitting diodes, the light emitting diodes may emit lights having the same wavelength band, or may emit lights having different wavelength bands from each other. For example, the plural light emitting diodes may include at least one of a light emitting diode that emits a red light, a light emitting diode that emits a blue light, and a light emitting diode that emits a green light.

In the exemplary embodiment of the present disclosure, when the first light source includes the light emitting diodes that emit the lights having different wavelengths, a composition ratio of the light emitting diodes may differ depending on the wavelength. For example, the light emitting diodes that emit the red light may be provided less than the light emitting diodes that emit the blue light or the green light, and a light emitting diode that emits the white light may be provided.

In addition, the first light source in the present exemplary embodiment may provide energy required for plant growth. More specifically, the first light source may provide the energy in the form of light for the plants to perform photosynthesis and grow. The wavelength of the light provided by the first light source may thus be determined by taking into account an absorption rate of a photoreceptor of the plants. For example, the first light source may emit a light having a relatively high light intensity in a blue light wavelength band (about 440 nm to about 495 nm) and a red light wavelength band (about 620 nm to about 750 nm), which are mainly used for the plant photosynthesis.

However, the light emission form of the first light source should not be limited to the above-described embodiment, and, in some cases, the light emitted from the first light source may have a spectrum similar to that of the sunlight, in which the lights of the entire range of wavelength bands are uniformly mixed. However, the first light source according to the exemplary embodiment of the present disclosure differs from the sunlight in that the first light source emits the light except for most of the light corresponding to the ultraviolet wavelength band. The first light source according to the exemplary embodiment of the present disclosure may emit the light having the wavelength band of about 380 nm to about 780 nm substantially corresponding to the entire wavelength band of the visible light. In the exemplary embodiment of the present disclosure, the expression "similar to sunlight" means a case where an overlapping area is equal to or greater than a predetermined value in comparison with a conventional art and a deviation (a degree of deviation with respect to a peak of the solar spectrum) of the peak from the solar spectrum is also equal to or smaller than a predetermined value based on a normalized solar spectrum. For example, in the exemplary embodiment of the present disclosure, the first light source may emit the light having an area of at least about 55% when compared with an area of the normalized solar spectrum, and a peak of a first light may have the deviation equal to or smaller than about 0.14 when compared with the normalized solar spectrum. As described above, since the first light source has the spectrum similar to that of the sunlight, the plant sprouts may grow well through efficient photosynthesis.

Referring to FIGS. 4A, 4B, and 5 again, the second light source 203 may emit a second light having a second wavelength band to the seeds.

The second wavelength band may be different from the first wavelength band and may be an ultraviolet wavelength band of about 250 nm to about 380 nm. In the exemplary embodiment of the present disclosure, the second light may correspond to at least one of a UV-A, a UV-B, and a UV-C. In the exemplary embodiment of the present disclosure, the second light source 203 may emit at least one light among lights having peak wavelengths of about 255 nm, about 275 nm, about 285 nm, about 295 nm, about 315 nm, about 335 nm, and about 365 nm.

In the exemplary embodiment of the present disclosure, the second light source 203 may emit the light in the wavelength band of about 270 nm to about 300 nm and may emit one of the lights having the peak wavelengths of about, 275 nm, about 285 nm, and about 295 nm. In the exemplary embodiment of the present disclosure, the second light source 203 may emit the light in the wavelength band of about 285 nm.

The second light source 203 may include one or more light emitting diodes to emit the light in the ultraviolet wavelength band. In the drawings, one first light source 31 is shown; however, it should not be limited to one. The plural light emitting diodes may be provided. In the case where the second light source 203 includes the plural light emitting diodes, the light emitting diodes may emit lights having the same wavelength band or may emit lights having different wavelength bands from each other. For example, the second light source 203 may be configured to allow some second light sources 33 or light emitting diodes to emit the light having the wavelength of about 275 nm and some other second light sources 33 or light emitting diodes to emit the light having the wavelength of about 285 nm.

The second light source 203 is to increase an antioxidant content in the plant sprout by irradiating the light in the ultraviolet wavelength band. The antioxidant content in the seeds and the plant sprouts may increase by irradiating the light emitted by the second light source 203 to the plant for a predetermined time at a predetermined intensity.

In the exemplary embodiment of the present disclosure, a light source that emits a light in an infrared or near-infrared wavelength band may further be provided in addition to the first light source 201 and/or the second light source 203.

Alternatively, the first light source 201 may emit the light in the infrared or near-infrared wavelength band in addition to the light in the visible light wavelength band.

In the exemplary embodiment of the present disclosure, a controller 220 for controlling whether to operate or not the first light source 201 and the second light source 203 may be connected to the first light source 201 and/or the second light source 203 by wire or wirelessly.

The controller 220 is connected to a power supply unit 230 that supplies a power to the controller 220. The power supply unit 230 may be connected to the light source unit 30 via the controller 220 or may be directly connected to the light source unit 30 to supply the power to the light source unit 30.

The controller 220 may control ON/OFF of the first light source 201 and/or the second light source 203 such that the first light source 201 and/or the second light source 203 emit the lights for a predetermine period at a predetermined intensity. The first light source 201 and the second light source 203 may be individually and independently operated to cultivate the plant sprouts to contain the antioxidant as much as possible.

The controller 220 may independently control the first light source 201 and the second light source 203 so that the first light and/or the second light are emitted at a predetermined frequency of emission in a predetermined wavelength band. In addition, when the first light source 201 and/or the second light source 203 include the plural light emitting diodes, the individual light emitting diodes may be independently controlled.

In the exemplary embodiment of the present disclosure, in a case where the housing is divided into a plurality of compartments, the first light sources 201 and/or the second light sources 203 may be provided in various numbers in the compartments. In this case, the controller 220 may independently control the first light sources 201 and/or the second light sources 203 corresponding to respective compartments such that the light is irradiated in various ways in the plurality of compartments. For example, the light in the first wavelength band may be irradiated from the first light source 201 to grow the plant sprouts in some compartments, and the light in the second wavelength band may be irradiated from the second light source 203 to increase the antioxidant content in other compartments. Each compartment included in the housing may form a closed dark room to be independently operated. Therefore, the light emitted from the first light source 201 and/or the second light source 203 provided in an arbitrary compartment may not exert an influence on other compartments.

In the exemplary embodiment of the present disclosure, the controller 220 may control whether to operate or not the first light source 201 and the second light source 203 according to a preset process or according to a user's input. For example, the controller 220 may not operate the first and second light sources 31 and 33 for a first time, may operate the first light source 201 for a second time, and may operate the second light source 203 for a third time in sequence. In addition, the user may manually input a length of the first time, the second time, and the third time and an intensity of the light of the first light source 201 and/or the second light source 203.

According to the exemplary embodiment of the present disclosure, the controller 220 may be connected to the water supply unit in addition to the first light source 201 and/or the second light source 203. The controller 220 may control an amount of the water supplied through the water supply unit and a time during which the water is supplied.

For example, the water supply unit may supply water to the seeds at predetermined time intervals without a user's operation. The intervals at which the water is supplied to the seeds may vary depending on the type of the seeds. In the case of plants that require a lot of water for growth, water may be supplied at relatively short intervals, and in the case of plants that require less water for growth, water may be supplied at relatively long intervals.

In the exemplary embodiment of the present disclosure, the seeds provided in a culture platform may be the seeds of the Poaceae family plant. For example, the seeds provided in the culture platform may be barley, wheat, oat, rice, millet, sorghum, sugarcane, and maize. However, the type of the seeds should not be limited thereto or thereby.

According to the exemplary embodiment of the present disclosure, as the above-described plant cultivation device is provided, the plant having the high antioxidant content may be obtained without being influenced by the external environment.

The plant cultivation device according to the exemplary embodiment of the present disclosure may be operated in the form of a large factory to obtain a large amount of plants, that is, a plant-production facility, as well as a cultivation device for home use or personal use to cultivate a relatively small amount of plants. Accordingly, the plant cultivation device may include a plurality of culture platforms, the first light source, the second light source, and the water supply unit (not shown).

In the exemplary embodiment of the present disclosure, various sensors, e.g., a temperature sensor, a humidity sensor, and a light intensity sensor, may be additionally disposed in the plant cultivation device operated in the plant-production facility, and the controller 220 may receive data from the sensors and may control the first and second light sources and the water supply device as a whole or individually. The cultivation device equipped with the plant cultivation system may transmit and receive data either directly or from a remote location by wired, wireless, or internet connection and may display data from the various sensors, the first and second light sources, and the water supply unit through a separate display. The user may instruct the controller 220 to implement optimal conditions after reviewing such data.

As described above, the plants with improved immune system may be easily grown in large quantities by using the plant cultivation device according to the exemplary embodiment of the present disclosure. In addition, when using the plant cultivation device according to the exemplary embodiment of the present disclosure, various types of plants may be grown simultaneously, and a growing environment suitable for the type of plants may be independently provided. Thus, when using the plant cultivation device according to the exemplary embodiment of the present disclosure, different types of plants may be grown simultaneously, and thus the cultivated plants have the high immunity.

In the above descriptions, the plant cultivation device according to the exemplary embodiment of the present disclosure has been described. Hereinafter, a plant cultivation method performed using the plant cultivation device will be described in detail.

Figure 7:
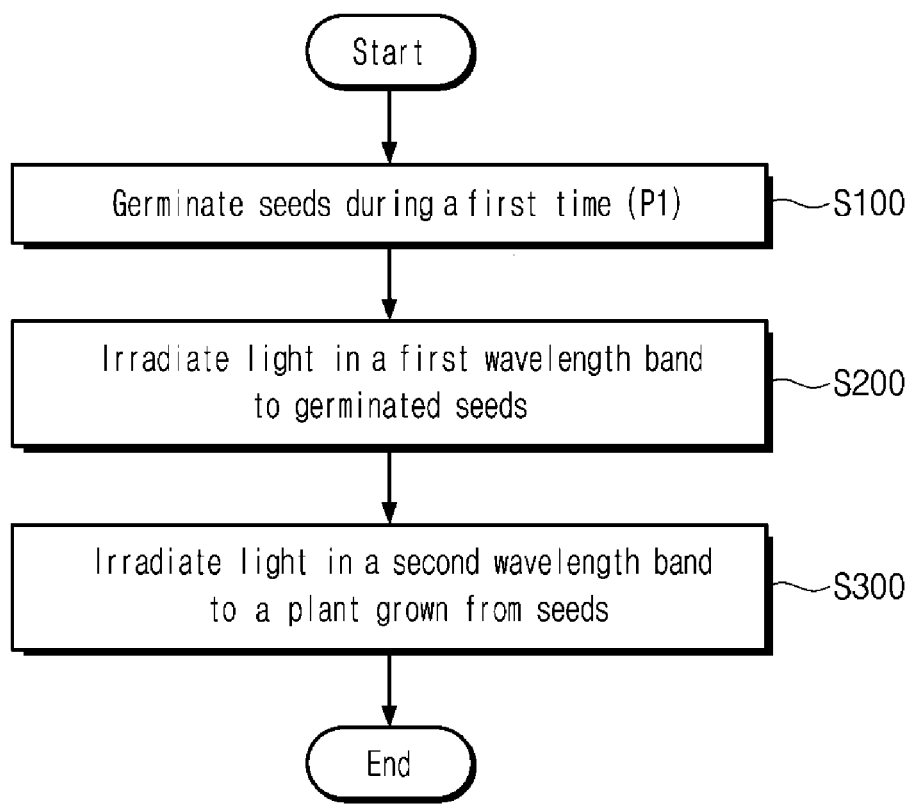
FIG. 7 is a flowchart showing a plant cultivation method according to an exemplary embodiment of the present disclosure.

FIG. 7 is a flowchart showing a plant cultivation method according to an exemplary embodiment of the present disclosure.

Referring to FIG. 7, the seed provided in the main body is germinated during a first time P1 (S100).

The germination means a process by which a plant grows from a seed, and a seedling means a young plant grown from the germinated seed.

Since a germination condition may vary depending on the type of the seed, the inside of the main body may be set to match the germination condition of the seed during the first time P1. For example, in the case of a light-germinated seed requiring light for its germination, the light may be irradiated to the seed using the first light source during the first time P1. In the case of the light-germinated seed, the first light source may irradiate the red light to the seed. The red light converts the phythochromes in the seed from a red light absorbing form (Pr) to a near-infrared light absorbing form (Pfr), and the near-infrared light absorbing form phytochrome (Pfr) decreases abscisic acid content which leads to seed dormancy while increasing gibberellin content. Accordingly, the germination may be promoted by the red light. On the contrary, in the case of a dark-germinated seed that does not require light for its germination, the inside of the main body may be maintained in the dark room during the first time P1.

In the germination stage, an amount of water supplied by the water supply unit may increase. This is because the seed is required to absorb sufficient water to allow a cell metabolic reactions to begin and to grow. Therefore, the supply of the water may be concentrated in the germination stage such that the seed absorbs enough water or the seed starts imbibition.

In the germination stage, the inside of the main body may be maintained at a temperature of about 20 Celsius degrees to about 30 Celsius degrees. The germination of the seed may be promoted in the above temperature range. The main body may include various types of temperature control units to maintain the above temperature.

The first time P1 during which the germination process is performed may vary depending on the type of plant. Accordingly, users, or the controller may control the first time P1 differently depending on the type of plant that is to be cultivated.

Then, the light in the first wavelength band is irradiated to the germinated seed (S200).

The light in the first wavelength band may be irradiated to the germinated seed during a second time. As the light in the first wavelength band is irradiated to the germinated seed, the plant may be grown from the seed. The first wavelength band may be the visible light wavelength band; however, depending on circumstances, the first wavelength band may include the near-infrared wavelength band. The first wavelength band may differ depending on the type of the plant that is to be cultivated.

The light in the first wavelength band may be irradiated to the germinated seed at a dose of about 50 $\mu mol/m^2 s$ to about 300 $\mu mol/m^2 s$. In addition, for some crops, the light in the first wavelength band may be irradiated to the germinated seed at a dose of about 50 $\mu mol/m^2 s$ to about 70 $\mu mol/m^2 s$.

When the dose of the light in the first wavelength band is less than about 50 $\mu mol/m^2 s$, a chlorophyll production and a photosynthesis due to the light in the first wavelength band do not occur sufficiently, and thus the plant growth may be delayed. On the contrary, when the dose of the light in the first wavelength band exceeds about 300 $\mu mol/m^2 s$ that is a light saturation point, the plant may be dried because the plant is irradiated with an amount of light more than an amount that the plant needs. However, the light saturation point may vary for every crop and growth stage. For example, in the case of the seedling of the Fabaceae family plant and the Poaceae family plant, the light saturation point may be about 70 $\mu mol/m^2 s$. Accordingly, the light in the first wavelength band may be irradiated at the dose of about 50 $\mu mol/m^2 s$ to about 70 $\mu mol/m^2 s$.

The second time during which the light in the first wavelength band is irradiated may vary depending on the type of plant. Accordingly, the user or the controller may control the second time differently depending on the type of plant that is to be cultivated.

Then, the light in the second wavelength band is irradiated to the plant grown from the seed (S300).

The light in the second wavelength band may be irradiated to the plant during the third time. As the light in the second wavelength band is irradiated to the plant, the total phenolic compound content may increase in the plant.

The light in the second wavelength band may be irradiated to the plant grown from the seed during the third time right before harvesting the plant. Accordingly, the plant may receive the light for the third time calculating backward from the point of harvest, and thus a secondary metabolism in the plant may be promoted and the total phenolic compound content may increase.

The light in the second wavelength band may be irradiated to the seed or the plant at a dose of about 5 $\mu W/cm^2$ to about 15 $\mu W/cm^2$. As the light in the second wavelength band is irradiated to the plant at the above-mentioned dose, only the phenolic compound content may increase without causing damages and modifications of plant cells. For example, when the light is irradiated to the seed or the plant at the dose less than about 5 $\mu W/cm^2$, a stress applied to the plant cells is insufficient, and as a result, a hormesis response for the production of antioxidant may not be induced sufficiently. On the other hand, when the light is irradiated to the seed or the plant at the dose exceeding about 15 $\mu W/cm^2$, the plant cells may be damaged or modified.

An intensity of the light in the second wavelength band is not uniform in all wavelength bands. According to the type of plant, the intensity of the light in a specific wavelength band of the light having a wavelength of about 200 nm to about 400 nm may increase. For example, in the case where the plant is wheat, the intensity of the light having the wavelength of about 295 nm may increase among the wavelength band of about 200 nm to about 400 nm. Therefore, it is possible to irradiate the lights customized to each type of plant, and the total phenolic compound content in the plant may be maximized.

According to the exemplary embodiment, the seeds of the plant may be sequentially germinated and grown, and the secondary metabolism in the plant may be promoted. Thus, the plants with a high total phenolic compound content and a high antioxidant capacity may be obtained from commercially available seeds.

In the above descriptions, the plant cultivation method according to the exemplary embodiment of the present disclosure is schematically described. According to the exemplary embodiment, the plants may be automatically cultivated without the user's operation, and hereinafter, the method for cultivating the plant without the user's operation will be described in more detail.

Figure 8:
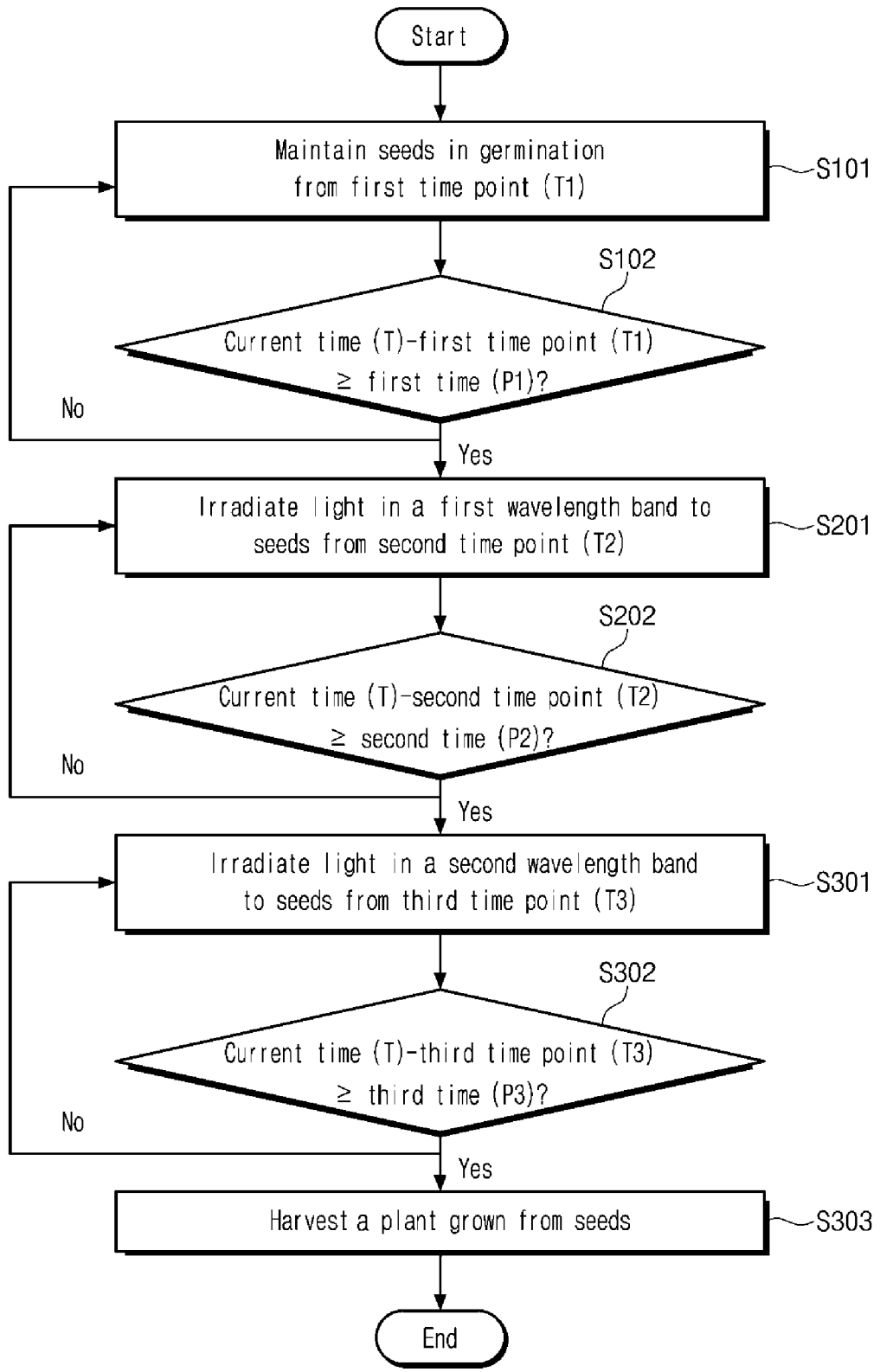
FIG. 8 is a flowchart showing a plant cultivation method according to an exemplary embodiment of the present disclosure.

FIG. 8 is a flowchart showing a plant cultivation method according to an exemplary embodiment of the present disclosure.

According to the exemplary embodiment of the present disclosure, the plant cultivation device is operated by the controller, and the controller cultivates the plant according to the plant cultivation method according to the exemplary embodiment of the present disclosure without the user's involvement.

First, when the seed is provided in the plant cultivation device, the controller maintains the seed in a germination condition from a first time point T1 (S101). The first time point T1 may be a time point at which the seed is put into the plant cultivation device according to the exemplary embodiment of the present disclosure and the user performs an operation to start the cultivation. For example, the operation to start the cultivation may be an action that turns on the plant cultivation device and pushes a button for starting the cultivation.

As described above, since the germination condition of the plant may differ depending on the type of plant, the controller may read out the germination condition suitable for the type of plant from a database and may apply the read-out germination condition.

Then, the controller compares the first time P1 with a difference between a current time T and the first time point T1, i.e., the elapsed time from the first time point T1 to the current time T (S102). The first time P1 is the time required for germinating the plant, and the controller determines that the germination of the seed is completed when the first time P1 elapses from the first time point T1.

As described above, since the first time P1 may vary depending on the type of plant, the controller may set the first time P1 differently depending on the type of plant. For example, when the plant is the Fabaceae family plant, or the Poaceae family plant, the first time P1 may be about 72 hours.

Then, when the difference between the current time T and the first time point T1 is equal to or greater than the first time P1, the controller allows the light in the first wavelength band to be irradiated to the seed (S201). In this case, a time point at which the controller controls the first light source to irradiate the light in the first wavelength band is a second time point T2. On the other hand, when the difference between the current time T and the first time point T1 is smaller than the first time P1, the controller maintains the inside of the plant cultivation device to be in the germination condition.

As described above, the light in the first wavelength band may be the visible light wavelength band and may include the near-infrared wavelength band depending on circumstances. As the light in the first wavelength band is irradiated, the plant may be grown from the germinated seed. Accordingly, the light in the first wavelength band may be controlled by taking into account the type of plant to increase a growth rate of the plant. The controller may read out information about the first wavelength band, which match with the type of plant, from the database and may control the first light source based on the read-out information.

The controller may control the first wavelength band and the amount of light irradiated by the first light source differently over time. For example, the first wavelength band and the amount of light in an initial stage of the growth of the plant, which is when the first light source starts to irradiate the light, may be different from the first wavelength band and the amount of light in a stage at which the growth of the plant is completed. Accordingly, the optimized light may be irradiated depending on the growth stage of the plant.

It is not necessary to continuously irradiate the light in the first wavelength band during the second time P2. The controller may control ON/OFF of the first light source during the second time P2. Therefore, an internal environment of the plant cultivation device may be set as a natural environment where the sun rises and falls. For example, in the second time P2, a ratio of a time during which the first light source emits the light in the first wavelength band to a time during which the first light source does not emit the light in the first wavelength band is about 1:1 to about 2:1. Thus, the environment similar to the natural environment where the sun rises and sets regularly everyday may be set in the plant cultivation device. As the environment similar to the natural environment is set, both photosynthesis and respiration of the plant may be maintained well balanced within the plant cultivation device.

Then, the controller determines whether a difference between the current time T and the second time point T2, i.e., the elapsed time from the second time point T2 to the current time T, is equal to or greater than the second time P2 (S202). The second time P2 is the time required for growing the plant, and the controller determines that the plant is not grown to a desired level unless the second time P2 elapses. However, the second time P2 is not the time required for the plant to grow fully. For example, when the plant is planned to be harvested at its sprout stage, the second time P2 may be the time required for the germinated seed to grow to the sprout.

The second time P2 may vary depending on the type of plant, and the controller may read out the second time P2 suitable for the type of plant from a database and may apply the read-out second time P2.

Then, when the difference between the current time T and the second time point T2 is equal or greater than the second time P2, the controller allows the second light source to irradiate the light in the second wavelength band to the seed (S301). In this case, a time point at which the controller controls the second light source to irradiate the light in the second wavelength band is a third time point T3. On the other hand, when the difference between the current time T and the second time point T2 is smaller than the second time P2, the controller controls the first light source to continuously irradiate the light in the first wavelength band.

As described above, the second wavelength band may be within the range from about 200 nm to about 400 nm. As the above-mentioned light is irradiated, the secondary metabolism of the plant may be activated and the total phenolic compound content in the plant may increase.

Then, the controller determines whether a difference between the current time T and the third time point T3, i.e., the elapsed time from the third time point T3 to the current time T, is equal to or greater than the third time P3 (S302). When the elapsed time from the third time point T3 to the current time T is equal or greater than the third time P3, the controller stops the emission of the light in the second wavelength band from the second light source. On the contrary, when the elapsed time from the third time point T3 to the current time T is smaller than the third time P3, the controller controls the second light source to continuously emit the light in the second wavelength band.

The third time P3 may be equal to or smaller than about 48 hours. In a case where the third time P3 exceeds about 48 hours, excessive stress more than needed is applied on the plant, and as a result, the plant cells are deformed or the plant is dried out. As the controller controls the second light source to irradiate the light only during the third time P3, the above-mentioned problem may not occur.

The intensity of the light emitted by the second light source during the third time P3 may be different for each wavelength. According to the type of plant, the intensity of the light in the specific wavelength band of the light having the wavelength of about 200 nm to about 400 nm may increase by the controller. Therefore, it is possible to irradiate the light customized to each type of plant, and the total phenolic compound content in the plant may be maximized.

Since the third time P3 is provided right before the harvest of the plant, the secondary metabolism activity of the plant may be achieved by the light in the second wavelength band after the plant has grown to the desired stage. Accordingly, the possibility that the plant growth is inhibited by the light irradiation in the second wavelength band may be reduced.

Then, the plant is harvested (S303). In this case, a harvesting device may be used, and the harvesting device isolates the plant from water after the third time P3 elapses. Accordingly, the plant may be prevented from growing excessively more than intended or needed. The harvested plant may be transferred to a separate space within the plant cultivation device by the harvesting device. Therefore, the harvested plant may be prevented from overgrowing or from being transformed by receiving the light in the second wavelength band after being harvested.

According to the exemplary embodiment of the present disclosure, the plant having a high total phenolic compound content may be cultivated according to a predetermined reference even though the user is not involved in the growing process. Thus, users who are not familiar with the plant cultivation may easily grow and harvest the plant with a high total phenolic compound content.

In the above descriptions, the plant cultivation device and the plant cultivation method, which are used to cultivate the plant with a high total phenolic compound content, are described. Hereinafter, the total phenolic compound content and the antioxidant capacity of the plant, which are obtained by the plant cultivation device and the plant cultivation method according to the exemplary embodiment of the present disclosure, will be described in detail with reference to data.

The following Tables 1A to 1E show that plants were grown by differently irradiating the light in the second wavelength band (about 275 nm, about 295 nm) on the Fabaceae family plant and the Poaceae family plant. Plant cultivation conditions are as follows.

TABLE 1A

| | Mung bean (Fabaceae family) | | |
|---|---|---|---|
| | Comparative example 1A | Embodiment example 1A | Embodiment example 2A |
| Light in second wavelength band | X | 295 nm | 275 nm |

TABLE 1B

| | Pea (Fabaceae family) | | |
|---|---|---|---|
| | Comparative example 1B | Embodiment example 1B | Embodiment example 2B |
| Light in second wavelength band | X | 295 nm | 275 nm |

TABLE 1C

| | Alfalfa (Fabaceae family) | | |
|---|---|---|---|
| | Comparative example 1C | Embodiment example 1C | Embodiment example 2C |
| Light in second wavelength band | X | 295 nm | 275 nm |

TABLE 1D

| | Wheat (Poaceae family) | | |
|---|---|---|---|
| | Comparative example 1D | Embodiment example 1D | Embodiment example 2D |
| Light in second wavelength band | X | 295 nm | 275 nm |

TABLE 1E

| | Barley (Poaceae family) | | |
|---|---|---|---|
| | Comparative example 1E | Embodiment example 1E | Embodiment example 2E |
| Light in second wavelength band | X | 295 nm | 275 nm |

The plant cultivation conditions are the same in both the Embodiment example and the Comparative example except that whether the light in the second wavelength band was irradiated. The plants of the Embodiment example and the Comparative example were germinated in the dark room condition during about 72 hours and were grown using a white light emitting diode light source during about 144 hours. The white light emitting diode light source was controlled with a ratio of an operating time to a non-operating time of 2:1 in about 144 hours. That is, the plants were grown for about 144 hours by repeating operations of turning on the white light emitting diode for about 16 hours in 24 hours and turning off the white light emitting diode for about 8 hours in 24 hours. The light was irradiated at a dose of about 60 μmol/m²s by the white light emitting diode during operation. The inside of the plant cultivation device was maintained at a temperature of about 24° C. and a relative humidity of about 70±5%.

In addition, the plants of the Embodiment examples were irradiated with the light in the second wavelength band during about 24 hours right before the harvest. The light in the second wavelength band was irradiated at a dose of about 10 μW/cm². The plants of the Comparative example is not irradiated with the light in the second wavelength band.

The following Tables 2A to 2E show the measured total phenolic compound content contained in the plants of the Embodiment examples and the Comparative examples. Experiments were conducted to determine how much the total phenolic compound content contained in Embodiment examples 1A to 1E and Embodiment examples 2A to 2E was increased in comparison with Comparative examples 1A to 1E.

TABLE 2A

| | Mung bean (Fabaceae family) | | |
|---|---|---|---|
| | Comparative example 1A | Embodiment example 1A | Embodiment example 2A |
| Increase/decrease rate in total phenolic compound content (%) | 100% | 94.7% | 109.8% |

TABLE 2B

| | Pea (Fabaceae family) | | |
|---|---|---|---|
| | Comparative example 1B | Embodiment example1B | Embodiment example2B |
| Increase/decrease rate in total phenolic compound content (%) | 100% | 112.7% | 118.9% |

TABLE 2C

| | Alfalfa (Fabaceae family) | | |
|---|---|---|---|
| | Comparative example 1C | Embodiment example 1C | Embodiment example 2C |
| Increase/decrease rate in total phenolic compound content (%) | 100% | 118.6% | 119.0% |

TABLE 2D

| | Wheat (Poaceae family) | | |
|---|---|---|---|
| | Comparative example 1D | Embodiment example 1D | Embodiment example 2D |
| Increase/decrease rate in total phenolic compound content (%) | 100% | 126.0% | 121.6% |

TABLE 2E

| | Barley (Poaceae family) | | |
|---|---|---|---|
| | Comparative example 1E | Embodiment example 1E | Embodiment example 2E |
| Increase/decrease rate in total phenolic compound content (%) | 100% | 125.7% | 133.9% |

Referring to Tables 2A to 2E, it was confirmed that the total phenolic compound content in the plants was generally increased in Embodiment examples 1A to 1E and Embodiment examples 2A to 2E as compared with Comparative examples 1A to 1E in which the light in the second wavelength band was not irradiated.

In the case of mung bean, as compared with Comparative example 1A in which the light in the second wavelength band was not irradiated, it was confirmed that the total phenolic compound content was increased by about 9.8% in Embodiment example 2A to which the light having the wavelength of about 275 nm was irradiated.

In the case of pea, as compared with Comparative example 1B in which the light in the second wavelength band was not irradiated, it was confirmed that the total phenolic compound content was increased by about 12.7% in Embodiment example 1B to which the light having the wavelength of about 295 nm was irradiated, and it was confirmed that the total phenolic compound content was increased by about 18.9% in Embodiment example 2B to which the light having the wavelength of about 275 nm was irradiated.

In the case of alfalfa, as compared with Comparative example 1C in which the light in the second wavelength band was not irradiated, it was confirmed that the total phenolic compound content was increased by about 18.6% in Embodiment example 1C to which the light having the wavelength of about 295 nm was irradiated, and it was confirmed that the total phenolic compound content was increased by about 19.0% in Embodiment example 2C to which the light having the wavelength of about 275 nm was irradiated.

In the case of wheat, as compared with Comparative example 1D in which the light in the second wavelength band was not irradiated, it was confirmed that the total phenolic compound content was increased by about 26.0% in Embodiment example 1D to which the light having the wavelength of about 295 nm was irradiated, and it was confirmed that the total phenolic compound content was increased by about 21.6% in Embodiment example 2D to which the light having the wavelength of about 275 nm was irradiated.

In the case of barley, as compared with Comparative example 1E in which the light in the second wavelength band was not irradiated, it was confirmed that the total phenolic compound content was increased by about 25.7% in Embodiment example 1E to which the light having the wavelength of about 295 nm was irradiated, and it was confirmed that the total phenolic compound content was increased by about 33.9% in Embodiment example 2E to which the light having the wavelength of about 275 nm was irradiated.

Accordingly, it was confirmed that the total phenolic compound content was significantly increased in the Fabaceae family plant and the Poaceae family plant when the Fabaceae family plant and the Poaceae family plant were irradiated with the light in the second wavelength band. In particular, in the case of Embodiment example 2A, Embodiment example 1B, Embodiment example 2B, Embodiment example 1C, Embodiment example 2C, Embodiment example 1E, and Embodiment example 2E, a statistically significant increase in the total phenolic compound content was confirmed.

Then, tests for measuring the antioxidant capacity were conducted to confirm whether the difference in the total phenolic compound content causes differences in the actual antioxidant capacity. The antioxidant capacity was measured by an ABTS assay using ABTS [2,2'-azino-bis (3-ethylbenzothiazoline-6-sulphonic acid]. The blue ABTS radical cation is reactive towards antioxidants and is converted back to its colorless neutral form. As the antioxidant content increases, the amount of ABTS radical cation, which is converted back to its colorless neutral form, increases, and the blue color of the ABTS becomes faded. Accordingly, the antioxidant capacity was measured against antioxidant capacity of Trolox that is an antioxidant substance by spectrophotometrically analyzing a color change of an ABTS solution after a plant extract of Embodiment examples and Comparative examples was reacted with the ABTS solution.

The following Tables 3A to 3E show the measured antioxidant capacity of the plants of the Embodiment examples and the Comparative examples. Experiments were conducted to determine how much the antioxidant capacity of Embodiment examples 1A to 1E and Embodiment examples 2A to 2E was increased in comparison with Comparative examples 1A to 1E.

TABLE 3A

| | Mung bean (Fabaceae family) | | |
| --- | --- | --- | --- |
| | Comparative example 1A | Embodiment example 1A | Embodiment example 2A |
| Increase/decrease of antioxidant capacity (%) | 100% | 120.6% | 134.5% |

TABLE 3B

| | Pea (Fabaceae family) | | |
| --- | --- | --- | --- |
| | Comparative example 1B | Embodiment example 1B | Embodiment example 2B |
| Increase/decrease of antioxidant capacity (%) | 100% | 120.8% | 123.4% |

TABLE 3C

| | Alfalfa (Fabaceae family) | | |
| --- | --- | --- | --- |
| | Comparative example 1C | Embodiment example 1C | Embodiment example 2C |
| Increase/decrease of antioxidant capacity (%) | 100% | 99.2% | 99.9% |

TBLE 3D

| | Wheat (Poaceae family) | | |
| --- | --- | --- | --- |
| | Comparative example 1D | Embodiment example 1D | Embodiment example 2D |
| Increase/decrease of antioxidant capacity (%) | 100% | 132.7% | 139.5% |

TABLE 3E

| | Barley (Poaceae family) | | |
| --- | --- | --- | --- |
| | Comparative example 1E | Embodiment example 1E | Embodiment example 2E |
| Increase/decrease of antioxidant capacity (%) | 100% | 146.2% | 146.2% |

In the case of mung bean, as compared with Comparative example 1A in which the light in the second wavelength band was not irradiated, it was confirmed that the antioxidant capacity was increased by about 20.6% in Embodiment example 1A to which the light having the wavelength of about 295 nm was irradiated, and it was confirmed that the antioxidant capacity was increased by about 34.5% in Embodiment example 2A to which the light having the wavelength of about 275 nm was irradiated.

In the case of pea, as compared with Comparative example 1B in which the light in the second wavelength band was not irradiated, it was confirmed that the antioxidant capacity was increased by about 20.8% in Embodiment example 1B to which the light having the wavelength of about 295 nm was irradiated, and it was confirmed that the antioxidant capacity was increased by about 23.4% in Embodiment example 2B to which the light having the wavelength of about 275 nm was irradiated.

In the case of alfalfa, when comparing Comparative example 1C in which the light in the second wavelength band was not irradiated with Embodiment examples 1C and 2C, it was confirmed that there was no substantial change in the antioxidant capacity.

In the case of wheat, as compared with Comparative example 1D in which the light in the second wavelength band was not irradiated, it was confirmed that the antioxidant capacity was increased by about 32.7% in Embodiment example 1D to which the light having the wavelength of about 295 nm was irradiated, and it was confirmed that the antioxidant capacity was increased by about 39.5% in Embodiment example 2D to which the light having the wavelength of about 275 nm was irradiated.

In the case of barley, as compared with Comparative example 1E in which the light in the second wavelength band was not irradiated, it was confirmed that the antioxidant capacity was increased by about 46.2% in Embodiment example 1E to which the light having the wavelength of about 295 nm was irradiated, and it was confirmed that the antioxidant capacity was increased by about 46.2% in Embodiment example 2E to which the light having the wavelength of about 275 nm was irradiated.

As described above, in the case of the Fabaceae family plant and the Poaceae family plant, it has been confirmed that the total phenolic compound content generally leads to the increase in the actual antioxidant capacity. In particular, in the case of Embodiment example 1A, Embodiment example 2A, Embodiment example 1B, Embodiment example 2B, Embodiment example 1E, and Embodiment example 2E, a statistically significant increase in the antioxidant capacity was confirmed.

Figure 9:
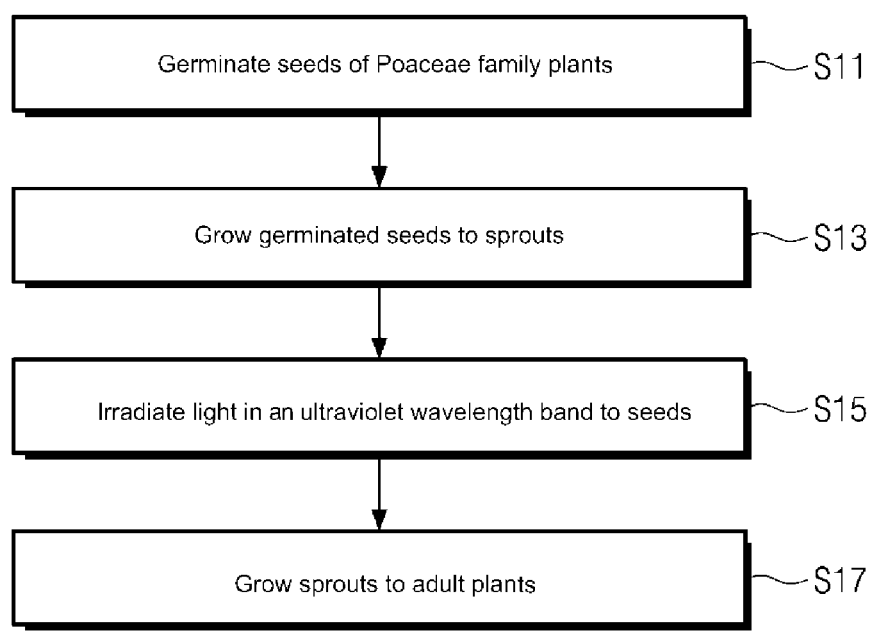
FIG. 9 is a flowchart showing a cultivation method according to an exemplary embodiment of the present disclosure.

FIG. 9 is a flowchart showing a cultivation method according to an exemplary embodiment of the present disclosure.

Referring to FIG. 9, according to another embodiment of the present disclosure, the cultivation method includes germinating the seeds of the plant (S11), growing the germinated seeds to the sprouts (S13), irradiating the light in the ultraviolet wavelength band to the plants (S15), and growing the sprouts of the plant to an adult plant (S17). In this case, the growing the sprouts of the plant means both growing the sprouts of the plant to the adult plant and growing the sprouts of the plant to a certain state before the adult plant stage. A time duration for growing the sprouts of the plant (S17) may vary depending on the type of plants.

The germination of the plant may be performed by putting the barley seeds into the cultivation device according to the exemplary embodiment of the present disclosure and supplying water in a dark condition. In the exemplary embodiment of the present disclosure, water may be supplied to the seeds of the plant under the dark condition from about 1 day to about 5 days. For example, the plant may be germinated by supplying water to the seeds under the dark condition for about 3 days.

The seeds of the plant may be soaked and swollen with a purified water for a predetermined time to be germinated. This is to allow the seeds to absorb sufficient water, and thus, the water may be supplied to the seeds in the germinating stage. Since the germination condition may vary depending on the type of plant seeds, surroundings of the seeds may be set to match the germination condition of the seeds during the first time. For example, in the case of dark germination seeds that do not require a light for their germination, the inside of the housing may be maintained as the dark room during the first time, and thus the inside of the housing may be maintained in the dark condition when the seeds are germinated.

In the germination stage, appropriate temperature and humidity to germinate the seeds of plant may be maintained. Various temperature control units, for example, a heater and/or a cooler, may be used to maintain the temperature around the seeds of the plant.

In the germination stage, water may be supplied to the seeds by the water supply unit. This is because the seeds are required to absorb sufficient water for initiating cellular metabolic process and growth. Therefore, the supply of water may be concentrated in the germination stage such that the seeds absorb enough water or the seeds are imbibed. In the present exemplary embodiment, the purified water may be supplied.

Then, the germinated seeds are grown to the sprouts, and the light in the ultraviolet wavelength band is irradiated to the sprouts. Here, the operation of irradiating the light in the ultraviolet wavelength band may be performed together with the operation of growing the seeds to the sprouts. This is explained as follows.

To grow the germinated seeds into the plants, the dark condition or lighting condition, or the dark or lighting condition may be repeated. In the exemplary embodiment of the present disclosure, the lighting condition may be maintained during the first time, the dark condition may be maintained during the second time, and the lighting condition and the dark condition may be repeatedly performed. In other words, the second time during which the light in the first wavelength band is irradiated may be continuous, but the second time may have a light cycle in which lighting and darkness are repeated. In this case, the lighting condition is maintained for a predetermined time, and the dark condition is maintained for another predetermined time. The lighting condition and the dark condition may be repeated a predetermined number of times on a 24-hour basis in general. For example, on the 24-hour basis, the lighting condition may be maintained for about 14 hours to about 18 hours, and the dark condition may be repeated within about 6 hours to about 10 hours. In the exemplary embodiment of the present disclosure, the light cycle may include the lighting condition of about 16 hours and the dark condition of about 8 hours, which are repeated on the 24-hour basis, and the light cycle may be repeated for about 4 days to about 10 days. In the exemplary embodiment of the present disclosure, the lighting condition may be maintained for about 16 hours, the dark condition may be maintained for about 8 hours, and the light and dark conditions may be repeated for about 7 days.

In the exemplary embodiment of the present disclosure, both the first light source and the second light source are maintained in a turn-off state during the dark condition, and the first light source is maintained in a turn-on state during the lighting condition. During the lighting condition, the first light may be irradiated to the sprouts of the plant at a dose of about 60 µmol/m²s, and the second light may be irradiated at an energy of about 10 µW/cm². The dose of the first light is to induce the photosynthesis and the growth of the plant sprouts.

In the present exemplary embodiment, the second light source may be maintained at a constant dose in a turn-on state for a certain period of time during the first time under the lighting condition. The second light source may emit the light for a time duration that is equal to or smaller than that of the first light source when the first light source is turned on. Alternatively, the second light source may be repeatedly turned on and off for a predetermined time as a predetermined pattern. In other words, the second light source may periodically emit the light when the first light source is turned on. In the present exemplary embodiment, the irradiation period of the second light source may be configured in various ways and may have a repetitive pattern in which the turn-on and the turn-off are set for a predetermined time. The irradiation of the second light may be continuous, however, although the irradiation of the second light is maintained without interruption, the second light may be irradiated no more than 7 days.

However, the dose of the second light source is limited to a dose that does not damage the plant. For example, in the exemplary embodiment of the present disclosure, the second light source may irradiate the light at a maximum dose of about 13.44 kJ/m²s. The second light source may provide a light to the plant at a dose of about 1.08 kJ/m²s or more so that a sufficient antioxidants may be produced in the plant.

Then, plant may be grown into the adult plant. In this case, the irradiation of the second light, that is, the irradiation of the ultraviolet light may be carried out within a period of time from after the seeds are germinated until the seeds become the adult plants. However, the present disclosure should not be limited thereto or thereby.

In the exemplary embodiment of the present disclosure, the cultivating of the sprout to the adult plant may be omitted, and the sprout with high antioxidant compounds content may be harvested before the sprout grows into the adult plant.

Through the above-described method, the plants with the increased content of antioxidant may be obtained. In particular, the Poaceae family plant with the increased antioxidant content may be obtained through the above-described method. Accordingly, since the Poaceae family plant itself contains a large amount of antioxidants, the immunity of the Poaceae family plant increases, and a high-quality plant that is resistant to bacteria and microorganisms may be obtained. As infections with bacteria or microorganisms are less likely occur, formulation cost, product degradation, environmental pollution, and exposure of workers to risks, which arise from the spraying of pesticides may be reduced. Further, when the Poaceae family plant is ingested by humans, it may be helpful in preventing aging of cells in the human body since its antioxidant content is high. For example, the barley sprouts having a high antioxidant content may be ingested by humans after being harvested, or may be ingested by humans after further processing for an ingredient for various food items.

In the case of cultivating the Poaceae family sprouts by the above-mentioned method, the antioxidant content increases in the Poaceae family sprouts.

Experimental Example 1. Method of Determining a Total Antioxidant Content

The determination of the total antioxidant content was carried out in the form of checking the total phenolic compound content.

To determine the total phenolic compound content, the barley sprouts were first lyophilized and then pulverized after being collected among the Poaceae family plants. The pulverized sample was dipped into about 0.09 g of deionized water and about 8 mL of 80% acetone, mixed well, and applied with an ultrasonic treatment for about 15 minutes. Then, the sample was kept at about −20° C./dark condition for about 12 hours or longer to be extracted. The extracted sample was placed in a centrifuge (RCF 3000/RPM 1350) and centrifuged for about 2 minutes, and then, about 135 μL of distilled water, about 750 μL of about 10% Folin-Ciocalteu reagent, about 50 μL of sample, and about 600 μL of about 7.5% Na2CO3 were added in sequence to a new test tube. Then, after mixing well for about 10 seconds, they were allowed to react in a constant temperature water bath at about 45° C. for about 15 minutes and then cooled sufficiently. After that, about 1 mL of the sufficiently cooled sample was transferred into a cuvette, and an absorbance was measured at about 765 nm by using a spectrophotometer. In this case, a solution of 0.4/0.35/0.3/0.25/0.2/0.15/0.1/0.05 mg/ml of gallic acid was prepared by diluting about 1 mg/mL of gallic acid, and its absorbance was measured to generate a standard curve, and thus the total phenolic compound content was measured.

Experimental Example 2. The Increase in the Antioxidant Content Depending on the Wavelength of the Second Light To determine the increase in the antioxidant content of the Poaceae family plants depending on the wavelength of the second light, the seeds of barley, which is a member of the Poaceae family plants, were prepared, and the barley seeds were germinated under the dark condition. The dark condition was maintained for about 3 days for the germination of the barley seeds. Then, on a 24-hour basis, the lighting condition was set to about 16 hours, the dark condition was set to about 8 hours, and the lighting condition and the dark condition were repeated for about 7 days. In this case, both the first and second lights were turned off during the dark condition, and the first light was turned on during the lighting condition. In the experimental example, during the lighting condition, the second light had peak wavelengths of about 275 nm, about 285 nm, and about 295 nm and was periodically repeatedly turned on and off. The cases where the light sources respectively having the peak wavelengths of about 275 nm, about 285 nm, and about 295 nm were used as the second light correspond to the first to third embodiment examples, and the case where the second light was not applied corresponds to a Comparative example. In the present experimental example, the Comparative example and Embodiment examples 1 to 3 were carried out in the same conditions except for the applied wavelength.

Figure 10:
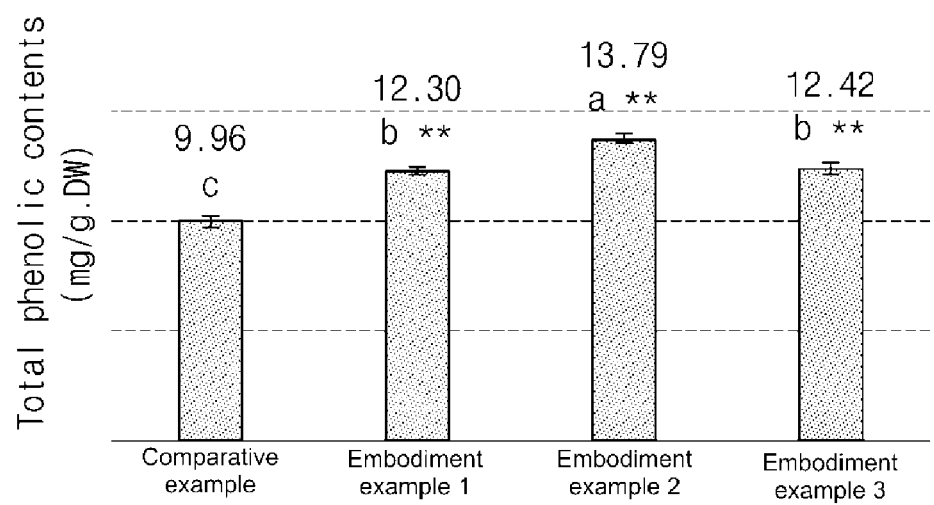
FIG. 10 is a graph showing a phenolic compound content as a function of a wavelength of a second light.

FIG. 10 is a graph showing a phenolic compound content as a function of a wavelength of a second light. Referring to FIG. 10, the phenolic compound content was remarkably increased in all of Embodiment examples 1 to 3 as compared with the Comparative example. That is, the total phenolic compound content was increased by about 20% or more in all of Embodiment examples 1 to 3 in comparison with the Comparative example. In particular, the phenolic compound content in Embodiment example 2 was remarkably increased than those observed in Embodiment examples 1 and 3 as compared with a control group. In detail, in the case where the second light has the peak wavelengths of about 275 nm and 295 nm, the total phenolic compound content was increased by about 23% as compared with the Comparative example, and in the case where the second light has the peak wavelength of about 285 nm, the total phenolic compound content was increased by about 38% as compared with the Comparative example.

As a result, it was found that the total phenolic compound content was remarkably increased through the irradiation of the second light, and it was found that the total phenolic compound content was remarkably increased by irradiation of the second light having the peak wavelength of about 285 nm.

Experimental Example 3. Damage of Barley Sprouts Depending on the Ultraviolet Dose When the second light was the light having the peak wavelength of about 285 nm, it was observed whether or not the barley sprouts were damaged due to the dose so as to determine a range of the effective dose.

Figure 11:
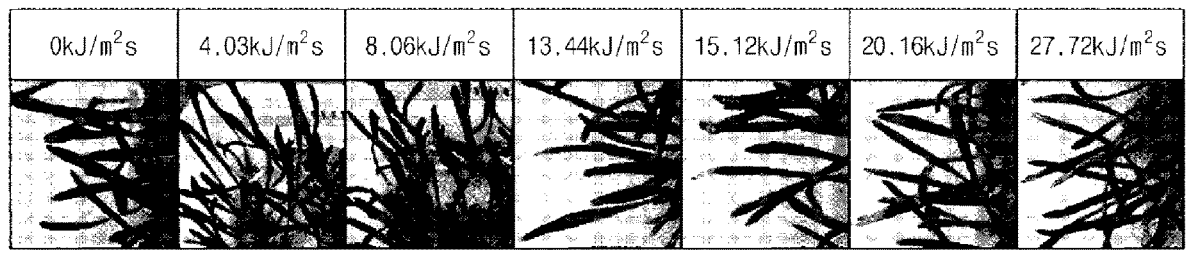
FIG. 11 are photographs of barley sprouts after a second light having a peak wavelength at 285 nm is applied to the barley sprouts with different doses under the same condition as in experimental example 2.

FIG. 11 are photographs of the barley sprouts after the second light having the peak wavelength at about 285 nm is applied to the barley sprouts with different doses under the same condition as in experimental example 2. The numerical values shown in the photographs of FIG. 11 indicate the dose of the second light applied to the barley sprouts.

Referring to FIG. 11, in a case where the applied amount of the second light was about 13.44 kJ/m$^2$s or less, no apparent difference was found as compared with a case where the second light was not applied to the barley sprouts. As a result, it was found that the barley sprouts were hardly affected by the application of the second light when the applied amount of the second light was about 13.44 kJ/m$^2$s or less. However, in a case where the applied amount of the second light was about 15.12 kJ/m$^2$s or more, it was found that each leaf of the barley sprouts was withered from the end thereof and was turned yellow.

As a result, it was found that the second light needs to be applied at the dose of about 14 kJ/m$^2$s or less.

Figure 12:
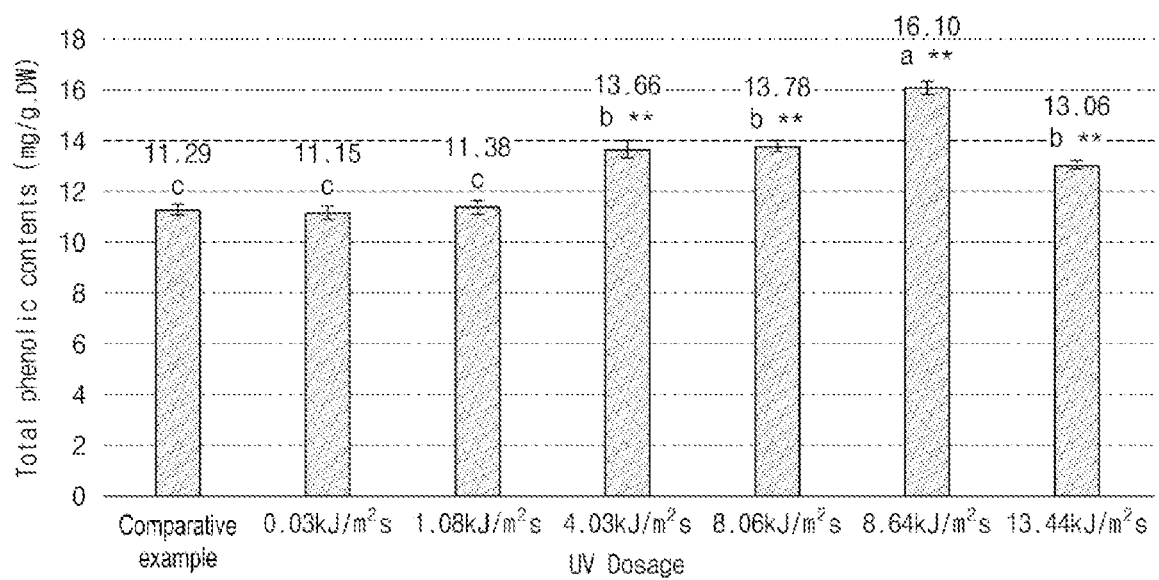
FIG. 12 is a graph showing a total phenolic compound content in the barley sprouts after the second light having the peak wavelength at 285 nm is applied to the barley sprouts with different doses under the same condition as in experimental example 2.

Experimental Example 4. Total Antioxidant Content in the Barley Sprouts Depending on the Dose of the Ultraviolet Light FIG. 12 is a graph showing the total phenolic compound content in the barley sprouts after the second light having the peak wavelength at 285 nm is applied to the barley sprouts with different doses under the same condition as in experimental example 2. In FIG. 12, since the damage caused by the second light, such as withering of the barley sprouts, occurs when the dose exceeds about 14 kJ/m$^2$s as in experimental Example 3, only the cases where the dose was about 14 kJ/m$^2$s or less are shown except the case where the dose is exceeded about 14 kJ/m$^2$s.

Referring to FIG. 12, in the cases where the applied amount of the second light was about 14 kJ/m$^2$s or less, the total phenolic compound content was increased in all the cases as compared with the Comparative example. In addition, in the cases where the applied amount of the second light was about 3 kJ/m$^2$s or more and about 14 kJ/m$^2$s or less, the total phenolic compound content was remarkably increased in all the cases as compared with the Comparative example. In particular, in the case where the second light was applied to the barley sprouts at a dose of about 8.64 kJ/m$^2$s, the total phenolic compound content was much higher than that of the Comparative example.

Experimental Example 5. Damage of Wheat Sprouts Depending on the Ultraviolet Dose When the second light was the light having the peak wavelength of about 285 nm, it was observed whether or not the wheat sprouts were damaged due to the dose so as to determine a range of the effective dose.

Figure 13:
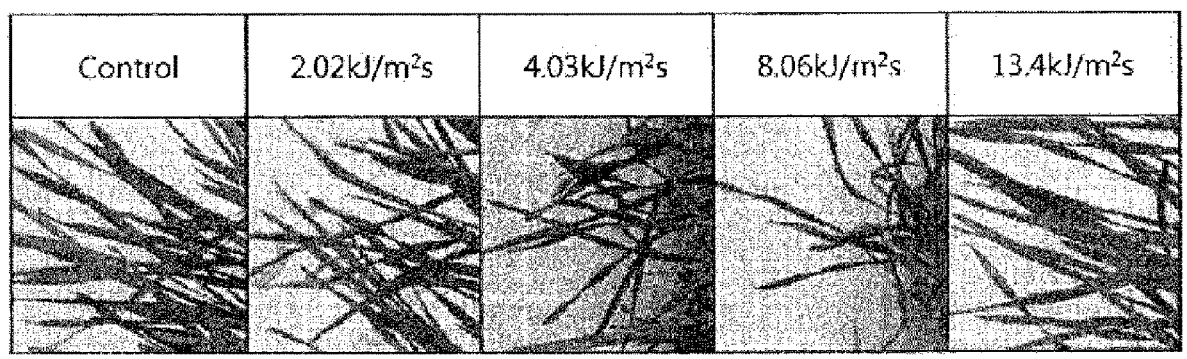
FIG. 13 are photographs of wheat sprouts after the second light having the peak wavelength at 285 nm is applied to the wheat sprouts with different doses under the same condition as in experimental example 2.

FIG. 13 are photographs of the wheat sprouts after the second light having the peak wavelength at about 285 nm is applied to the wheat sprouts with different doses under the same condition as in experimental example 2. The numerical values shown in the photographs of FIG. 13 indicate the dose of the second light applied to the wheat sprouts.

Referring to FIG. 13, in a case where the applied amount of the second light was about 13.4 kJ/m$^2$s or less, no difference in appearance was found as compared with a case where the second light was not applied to the wheat sprouts. As a result, it was found that the wheat sprouts were hardly affected by the application of the second light when the applied amount of the second light was about 13.4 kJ/m$^2$s or less. As a result, it was found that the second light needs to be applied at the dose of about 13.4 kJ/m$^2$s or less.

Figure 14:
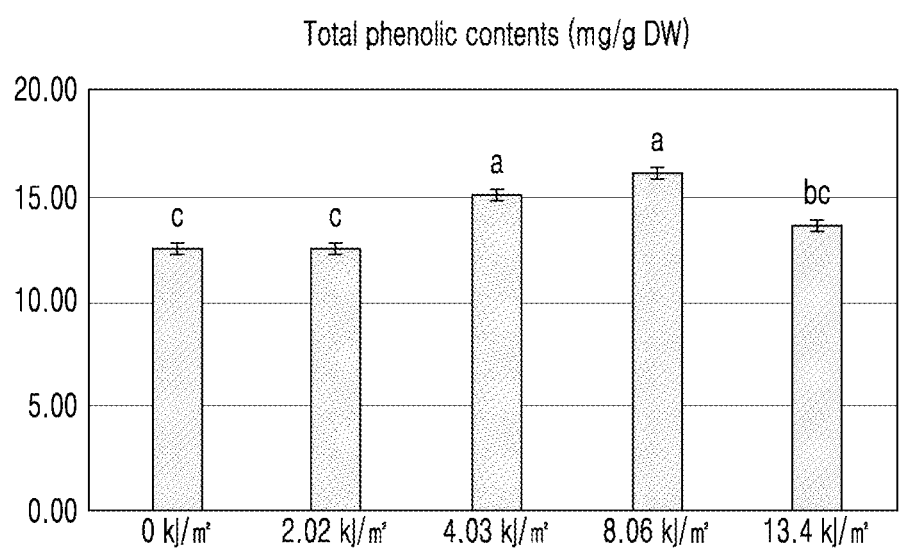
FIG. 14 is a graph showing a total phenolic compound content in the wheat sprouts after the second light having the peak wavelength at 285 nm is applied to the wheat sprouts with different doses under the same condition as in experimental example 2.

Experimental Example 6. Total Antioxidant Content in the Wheat Sprouts Depending on the Dose of the Ultraviolet Light FIG. 14 is a graph showing the total phenolic compound content in the wheat sprouts after the second light having the peak wavelength at 285 nm is applied to the wheat sprouts with different doses under the same condition as in experimental example 2. In FIG. 14, since the damage caused by the second light, such as withering of the wheat sprouts, occurs when the dose exceeds about 13.4 kJ/m$^2$s as in experimental Example 5, only the cases where the dose was about 13.4 kJ/m$^2$s or less are shown except the case where the dose exceeds about 13.4 kJ/m$^2$s.

Referring to FIG. 14, in the cases where the cumulative applied amount of the second light over a day was about 2.02 kJ/m$^2$ or less, the phenolic compound content was not increased in the wheat sprouts. In detail, it was found that the phenolic compound content in the wheat sprouts are about 13 mg/gDW in both cases where the wheat sprouts are not irradiated and the wheat sprouts are irradiated with the second light by about 2.02 kj/m2 over a day.

In the cases where the cumulative applied amount of the second light over a day exceeds about 13.4 kJ/m$^2$, it was found that the phenolic compound content was decreased in the wheat sprouts. In detail, in the cases where the second light was applied to the wheat sprouts over a day by about 13.4 kJ/m$^2$, it was found that the phenolic compound content in the wheat sprouts was about 14 mg/g DW. This was smaller than the phenolic compound content in the wheat sprouts obtained when the second light was applied to the wheat sprouts over a day by about 4.03 kJ/m$^2$ or about 8.06 kJ/m$^2$.

The above-described trend suggests that the cumulative amount of UV irradiation may be required to be equal to or greater than a threshold value so as to increase the amount of the secondary metabolites in the wheat sprouts by the UV irradiation. In addition, as the cumulative amount of UV irradiation increases, the sprouts are damaged by the UV. Accordingly, when the cumulative amount of UV irradiation is equal to or greater than a certain level, it suggests that useful substances including the phenolic compounds in the sprouts may be destroyed by the UV.

Therefore, it is preferred that the cumulative applied amount of the second light over a day is set to a range between about 4.03 kJ/m$^2$ and about 13.4 kJ/m$^2$ so as to increase the total phenolic compound content in the wheat sprouts.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A plant cultivation light source unit, comprising:
   a substrate; and
   a first group of light sources comprising a plurality of light sources disposed on the substrate, a light source comprising a light emitting structure including a first semiconductor layer, an active layer, and a second semiconductor layer;
   wherein the plurality of light sources operates to emit lights having different peak wavelengths and comprises:
      a first light source that emits first light having a first light spectrum including an area of at least about 55% overlapped with an area of a normalized solar spectrum;
      a second light source that emits second light having a wavelength for cryptochrome; and
      a third light source that emits third light having a wavelength for phytochrome,
      wherein the first light spectrum includes a peak having a deviation equal to or less than about 0.14 compared with the normalized solar spectrum.

2. The plant cultivation light source unit of claim 1, further comprising a second group of light sources that have a peak wavelength between 200 nm and 400 nm.

3. The plant cultivation light source unit of claim 2, wherein the second group of light sources is turned on or off such that a dose of the light is equal to or greater than about 1 kJ/m$^2$s and equal to or smaller than about 14 kJ/m$^2$s.

4. The plant cultivation light source unit of claim 1, further comprises a controller coupled to the plurality of light sources in the first group of light sources and controlling a lighting condition and a dark condition,
   wherein the first group of light sources is turned off during the dark condition.

5. The plant cultivation light source unit of claim 4, wherein a ratio of the lighting condition to the dark condition is 1:1 to 2:1.

6. The plant cultivation light source unit of claim 4, further comprising a second group of light sources that have a peak wavelength between 200 nm to 400 nm; and
   the controller is further configured to control the second group of light sources to irradiate light to a selected plant for a predetermined number of hours prior to harvesting of the selected plant.

7. The plant cultivation light source unit of claim 1, wherein the plurality of light sources in the first group of light sources further comprises an IR light source.

8. The plant cultivation light source unit of claim 1, wherein the plurality of light sources further comprises a white light emitting diode light source which irradiates at a dose of about 60 µmol/m$^2$s.

9. The plant cultivation light source unit of claim 1, wherein a plant includes a Fabaceae Family plant, or a Poaceae Family plant.

10. The plant cultivation light source unit of claim 1, wherein the first light source is configured to emit a light having a high light intensity in a blue light peak wavelength in a range of about 440 nm to about 495 nm and a red light peak wavelength in a range of about 620 nm to about 750 nm.

11. A plant cultivation device, comprising:
   a plant cultivation light source unit;
   a housing that houses a plant and the plant cultivation light source unit installed therein; and
   a controller that controls the plant cultivation light source unit;
   wherein the plant cultivation light source unit comprises:
      a substrate; and
      a first group of light sources comprising a plurality of light sources disposed on the substrate, a light source comprising a light emitting structure including a first semiconductor layer, an active layer, and a second semiconductor layer;
   wherein the plurality of light sources operates to emit lights having different peak wavelengths and comprises:
      a first light source that emits first light having a first light spectrum including an area of at least about 55% overlapped with an area of a normalized solar spectrum;
      a second light source that emits second light having a second light spectrum; and
      a third light source that emits third light having a third light spectrum,
      wherein the first light spectrum includes a peak having a deviation equal to or smaller than about 0.14 compared with the normalized solar spectrum.

12. The plant cultivation device of claim 11, wherein the plant cultivation light source unit further comprises a second group of light sources that have a peak wavelength between 200 nm and 400 nm.

13. The plant cultivation device of claim 12, wherein the second group of light sources is turned on or off such that a dose of light is equal to or greater than about 1 kJ/m$^2$s and equal to or smaller than about 14 kJ/m$^2$s.

14. The plant cultivation device of claim 11, wherein the controller is coupled to the plurality of light sources in the first group of light sources and controlling a lighting condition and a dark condition, wherein the first group of light sources is turned off during the dark condition.

15. The plant cultivation device of claim 14, wherein a ratio of the lighting condition to the dark condition is 1:1 to 2:1.

16. The plant cultivation device of claim 14, wherein the plant cultivation light source unit further comprises a second group of light sources that have a peak wavelength between 200 nm to 400 nm; and
   the controller controls the second group of light sources to irradiate light to the plant for a predetermined number of hours prior to harvesting of the plant.

17. The plant cultivation device of claim 11, wherein the plurality of light sources in the first group of light sources further comprises an IR light source.

18. The plant cultivation device of claim 11, wherein the plurality of light sources further comprises a white light emitting diode light source which irradiates at a dose of about 60 μmol/m$^2$s.

19. The plant cultivation device of claim 11, wherein the plant includes a Fabaceae Family plant, or a Poaceae Family plant.

* * * * *